US011616734B2

(12) United States Patent
Ganesan et al.

(10) Patent No.: US 11,616,734 B2
(45) Date of Patent: Mar. 28, 2023

(54) HOME NETWORK RESOURCE MANAGEMENT

(71) Applicant: HUGHES NETWORK SYSTEMS, LLC, Germantown, MD (US)

(72) Inventors: Venkat Ganesan, Germantown, MD (US); Tayyab Khan, Gaithersburg, MD (US); George Joseph Choquette, Potomac, MD (US); Eddie Beal, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 33 days.

(21) Appl. No.: 16/923,970

(22) Filed: Jul. 8, 2020

(65) Prior Publication Data

US 2022/0014477 A1    Jan. 13, 2022

(51) Int. Cl.
*H04L 47/80* (2022.01)
*H04L 47/78* (2022.01)

(52) U.S. Cl.
CPC .......... *H04L 47/805* (2013.01); *H04L 47/781* (2013.01)

(58) Field of Classification Search
CPC ............... H04B 7/1856; H04L 1/0002; H04L 1/0017; H04L 1/0026; H04L 47/125; H04L 47/726; H04W 24/02; H04W 28/0268; H04W 28/085; H04W 28/10; H04W 28/24; H04W 84/06
See application file for complete search history.

(56) References Cited

U.S. PATENT DOCUMENTS

| 7,948,883 B1* | 5/2011 | Croft, Jr. | H04L 12/2801 725/111 |
| 10,291,521 B1* | 5/2019 | Godbole | H04L 45/34 |
| 2005/0053052 A1* | 3/2005 | Ree | H04M 7/122 370/352 |
| 2011/0268052 A1* | 11/2011 | Koc | H04L 5/0032 370/329 |
| 2012/0218892 A1* | 8/2012 | Kotecha | H04L 47/215 370/235 |

(Continued)

OTHER PUBLICATIONS

Border et al., "Performance Enhancing Proxies Intended to Mitigate Link-Related Degradations," The Internet Society (Jun. 2001), 45 pages. http://tools.ietf.org/html/rfc3135, retrieved on Sep. 10, 2020.

*Primary Examiner* — Jason E Mattis
*Assistant Examiner* — Bao G Nguyen
(74) *Attorney, Agent, or Firm* — Sheppard, Mullin, Richter & Hampton LLP

(57) ABSTRACT

Some implementations of the disclosure are directed to a method, comprising: receiving a plurality of traffic flows transmitted by a plurality of user devices; determining, at a modem, a user device of the user devices that is associated with each of the traffic flows; classifying, at the modem, each of the traffic flows according to a class of service associated with a traffic class; and allocating, at the modem, bandwidth to each of the traffic flows based on the traffic flow's class of service and the user device associated with the traffic flow. A total available bandwidth may be allocated to the traffic flows as a function of traffic classes associated with the traffic flows, the classes of services associated with the traffic flows, and the user devices that transmitted the traffic flows.

20 Claims, 14 Drawing Sheets

(56) References Cited

U.S. PATENT DOCUMENTS

| | | | |
|---|---|---|---|
| 2016/0072574 A1* | 3/2016 | Xu | H04B 7/18586 |
| | | | 370/230 |
| 2016/0183126 A1* | 6/2016 | Roy | H04B 7/18578 |
| | | | 370/322 |
| 2016/0248676 A1* | 8/2016 | Thanasekaran | G06F 3/0613 |
| 2017/0187632 A1* | 6/2017 | Ko | H04B 10/278 |
| 2019/0037029 A1* | 1/2019 | Border | H04L 67/2876 |
| 2020/0177652 A1* | 6/2020 | Halepovic | H04L 65/4084 |
| 2020/0245192 A1* | 7/2020 | Roy | H04L 1/0002 |
| 2022/0039083 A1* | 2/2022 | Buldorini | H04W 76/10 |

\* cited by examiner

1100

```
┌─────────────────────────────────────────────────────────────────────────┐
│ Distribute bandwidth from the total available bandwidth to each of the  │
│ traffic classes associated with the traffic flows based on a configured │
│ minimum bandwidth for each of the traffic classes.                      │
│                                  1110                                   │
└─────────────────────────────────────────────────────────────────────────┘
                                     │
                                     ▼
┌─────────────────────────────────────────────────────────────────────────┐
│ Distribute the bandwidth distributed to each of the traffic classes to  │
│         the classes of services mapping to that traffic class.          │
│                                  1120                                   │
└─────────────────────────────────────────────────────────────────────────┘
                                     │
                                     ▼
┌─────────────────────────────────────────────────────────────────────────┐
│ Distribute Bandwidth Distributed To Each Of The Classes Of Services To  │
│    Each Of The User Devices Within Each Of The Classes Of Services      │
│                                  1130                                   │
└─────────────────────────────────────────────────────────────────────────┘
                                     │
                                     ▼
┌─────────────────────────────────────────────────────────────────────────┐
│ Equally Distribute Bandwidth Distributed To Each User Device And Class  │
│ Of Service Combination To All Traffic Flows Originating From The User   │
│                    Device And Class Of Service Combination              │
│                                  1140                                   │
└─────────────────────────────────────────────────────────────────────────┘
```

FIG. 11

HOME NETWORK RESOURCE MANAGEMENT

BACKGROUND

Home network Internet traffic encompasses variety of traffic, including voice, video, and data with assured quality of service such as latency, throughput, jitter, and privacy. Traditionally, traffic flows are prioritized based on the flows themselves, and not the originator or destination of the flows. For example, if multiple devices are connected to a network, the individual traffic flows that these devices originate are independently flow controlled irrespective of where they come from. The traffic flows may be classified by identifying the traffic flows based on Internet Protocol (IP) addresses and port numbers (optionally including protocol if needed); or by deep packet inspection, which classifies packets based on specific data patterns in the payload.

As such, connections may be classified based upon pro-visioned (static) multi-field (MF) attributes to a particular traffic class. Some Internet protocols have different Quality of Service (QoS) expectations depending on the external use of the application. For example, while a user browses a webpage, the user's device may download static content (e.g., text and pictures) or perform pseudo-downloads of audio/video clips. The user experience for each of these "web browsing" actions creates different QoS expectations.

SUMMARY

Implementations of the disclosure are directed to allocating bandwidth to each of a plurality of traffic flows transmitted by a plurality of user devices based on the traffic flow's class of service and the user device associated with the traffic flow.

In one embodiment, a method, comprises: receiving a plurality of traffic flows transmitted by a plurality of user devices; determining, at a modem, a user device of the user devices that is associated with each of the traffic flows; classifying, at the modem, each of the traffic flows according to a class of service associated with a traffic class; and allocating, at the modem, bandwidth to each of the traffic flows based on the traffic flow's class of service and the user device associated with the traffic flow. The traffic flows may be destined for a host on the Internet.

In some implementations, each of the user devices is assigned a priority relative to the other user devices, wherein allocating bandwidth to each of the traffic flows comprises: allocating bandwidth to each of the traffic flows based on the traffic flow's class of service and the priority assigned to the user device transmitting the traffic flow.

In some implementations, allocating bandwidth to each of the traffic flows comprises: distributing bandwidth to each of the user devices based on a minimum bandwidth requirement of the user device; and distributing the bandwidth allocated to each of the user devices among one or more of the traffic flows transmitted by the user device.

In some implementations, allocating bandwidth to each of the traffic flows comprises: distributing bandwidth from a total available bandwidth to each of the traffic classes based on a configured minimum bandwidth for each of the traffic classes; distributing the bandwidth distributed to each of the traffic classes to the classes of services associated with the traffic class; and distributing the bandwidth distributed to each of the classes of services to each of the user devices that transmitted one or more of the traffic flows associated with the class of service.

In some implementations, the method further comprises: equally distributing the bandwidth distributed to one of the user devices for one of the classes of services to a plurality of the traffic flows transmitted by the one user device that are associated with the class of service. In some implementations, the configured minimum bandwidth is a configured minimum bandwidth percentage.

In some implementations, distributing the bandwidth distributed to each of the traffic classes to the classes of services associated with the traffic class, comprises: distributing, based on weights assigned to the classes of services associated with one of the traffic classes, the bandwidth distributed to the one traffic class to the classes of service associated with the one traffic class.

In some implementations, distributing the bandwidth distributed to each of the classes of services to each of the user devices that transmitted one or more of the traffic flows associated with the class of service, comprises: distributing, based on weights assigned to the user devices that transmitted one more of the traffic flows associated with one of the classes of service, the bandwidth distributed to the one class of service to the user devices that transmitted the one more of the traffic flows associated with the one class of service.

In some implementations, allocating the bandwidth to each of the traffic flows, comprises: distributing a total available bandwidth to the traffic flows as a function of traffic classes associated with the traffic flows, the classes of services associated with the traffic flows, and the user devices that transmitted the traffic flows; and distributing any bandwidth leftover, after distributing the total available bandwidth, in a round robin scheme in strict priority order.

In some implementations, classifying each of the traffic flows according to the class of service associated with the traffic class, comprises: determining a recent dominant host application type of one of the devices that transmitted one of the traffic flows; and classifying, based on at least the recent dominant host application type, the one traffic flow.

In one embodiment, a system comprises a processor; and a non-transitory computer-readable storage medium storing instructions that, when executed by the processor, cause the system to perform a method, comprising: receiving a plurality of traffic flows transmitted by a plurality of user devices; determining a user device of the user devices that is associated with each of the traffic flows; classifying each of the traffic flows according to a class of service associated with a traffic class; and allocating bandwidth to each of the traffic flows based on the traffic flow's class of service and the user device associated with the traffic flow. In some implementations, the system is a modem.

In one embodiment, a method of allocating bandwidth to each of a plurality traffic flows transmitted by a plurality of user devices, comprises: distributing, at a modem, based on a configured minimum bandwidth for each of a plurality of traffic classes associated with the traffic flows, bandwidth from a total available bandwidth to each of the traffic classes; distributing, at the modem, the bandwidth distributed to each of the traffic classes to one or more classes of services associated with the traffic class and the traffic flows; and distributing, at the modem, the bandwidth distributed to each of the classes of services to each of the user devices that transmitted one or more of the traffic flows associated with the class of service.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 11 illustrates an example method for distributing/assigning bandwidth to user flows as a function of the flow's traffic class, class of service, and the user device from which the flow originated, in accordance with implementations of the disclosure.

Figure 1:
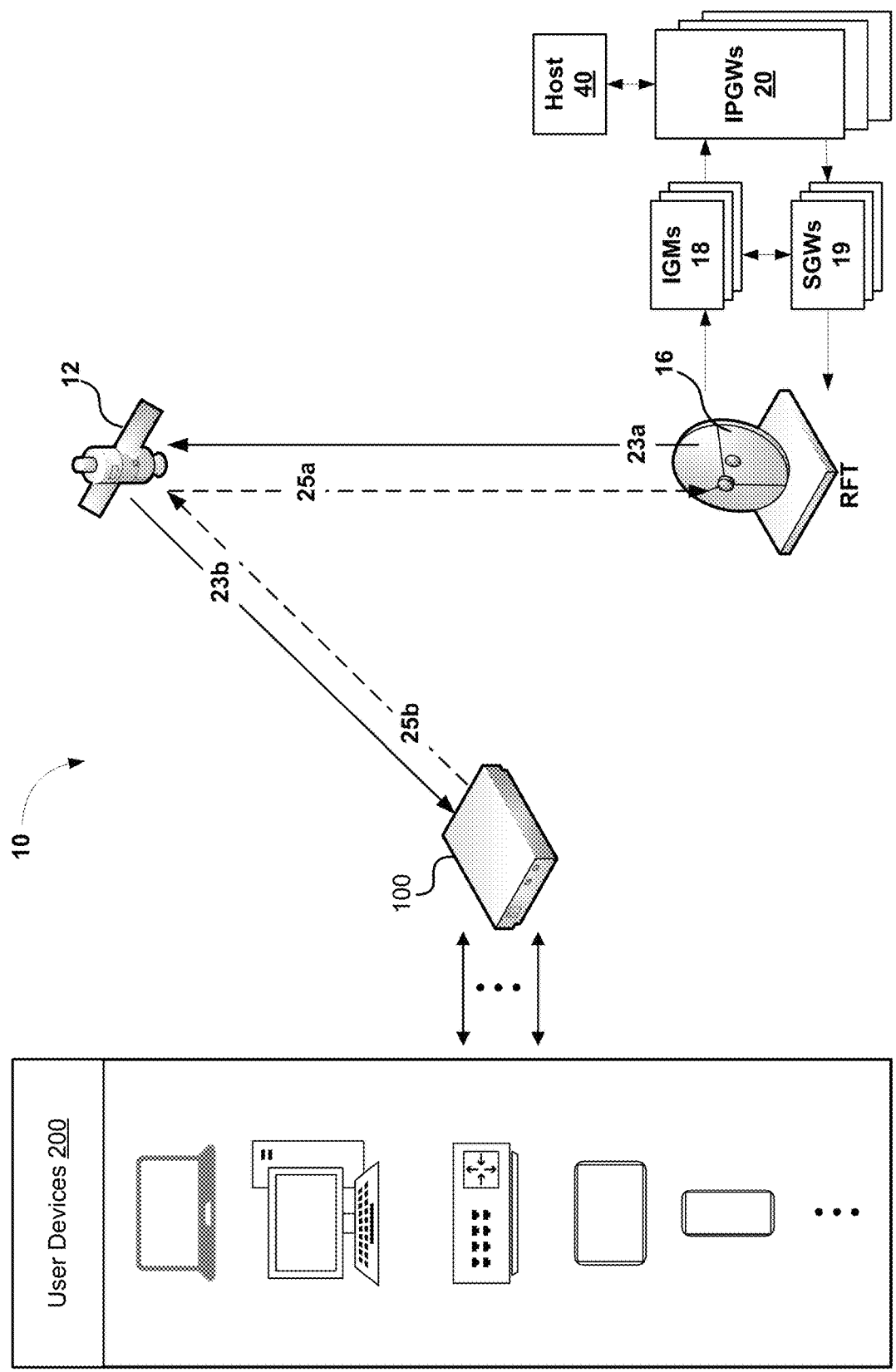
FIG. 1 illustrates an example satellite network including a satellite terminal in which the technology described herein may be implemented.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

The traditional approach of flow/connection based traffic classification discussed above does not lend itself to the optimal use of limited resources among competing devices, especially in the case of a customer premise modem, which has limited computing resources, including memory resources, processing power and uplink bandwidth. For example, if ten traffic flows originate from one device, and one traffic flow originates from another device, there may be a lopsided allocation of modem resources to the device originating ten traffic flows if the two devices are not identified when allocating resources to the eleven traffic flows. As such, while the use of flow based classification may be beneficial in many scenarios, it may pose challenges in the following scenarios: a system's ability to classify devices based on their predominant application usage; a system's ability to reclassify devices based on their current connection characteristics; a system's ability to identify devices that are behaving out of their intended use/norm; a system's ability to apply fair queuing policy across all in home devices in times of bandwidth congestion; a customer's ability to prioritize traffic from different devices; the ability of the customer to configure device based throughput policing; the ability of the customer to configure device based volume policing; system's ability to apply device based volume usage policing; the customer's ability to prioritize traffic from devices; the customer's ability to configure device based throughput and volume policing; the system's ability to apply device based throughput and volume usage policing; and the system's ability to prioritize web traffic based on domain on a device basis.

Given the limited computing resources available, particularly in the uplink direction from the user's premise to the network (e.g., Internet), a method is needed to shape and/or limit the ingress traffic to provide equitable distribution of available resources among all the competing connected devices. To this end, the systems and methods of the present disclosure are directed to allocating computing resources to traffic flows based on the device originating the traffic flows and/or the destination of the traffic flows. As such, traffic classification may consider both the type of flow and the device associated with the traffic flow. The techniques described herein may be implemented using a modem (e.g., a satellite modem) that is programmed to allocate resources to traffic flows based at least in part on the originating device or destination device. In accordance with some implementations described herein, the modem may provide a user interface (e.g., a web interface through a web browser) through which a user may prioritize or deprioritize traffic flows coming from particular devices. By virtue of implementing the techniques described herein, limited computing resources such as uplink bandwidth, modem memory, and modem processing power may be optimally allocated among competing devices in a way that will enhance the user experience.

FIG. 1 illustrates an example satellite network 10 including a satellite terminal 100 in which the technology described herein may be implemented. It should be noted that although the traffic flow control systems and methods described herein will primarily be described in the context of satellite networks including satellite terminals that utilize a satellite modem, the systems and methods described herein may also be applied to terrestrial communications networks such as cellular communication networks that utilize modems.

Satellite network 10 in this example can include a satellite 12, satellite terminal 100, radio frequency terminals (RFT) 16, inroute group managers (IGMs) 18, satellite gateways (SGWs) 19, and IP gateways (IPGWs) 20. The satellite network may be a shared access broadband network. Other types of shared access networks may include, for example, wireless networks such as a $5^{th}$ Generation (5G) cellular network, $4^{th}$ Generation Long Term Evolution (4G LTE) and WiMAX networks, which may include cellular and WiFi equipped devices. Although a single satellite 12 is shown in this example, it should be appreciated that satellite network 10 may be a multi-satellite network 10 where a particular satellite services satellite terminal 100 depending on the present location of terminal 100 and present location of the spotbeam of the satellite.

Feeder links may carry data between RFT 16 and satellite 12, and may include: forward uplink 23a for transmitting data from RFT 16 to satellite 12; and return downlink 25a for transmitting data from satellite 12 to RFT 16. User links may carry data between satellite 12 and satellite terminal 100, and may include: return uplink 25b for transmitting data from satellite terminal 100 to satellite 12; and forward downlinks 23b for transmitting data from satellite 12 to terminal 100. Forward uplinks 23a and forward downlink 23b form an outroute, and return uplinks 25b and return downlinks 25a may form an inroute. SGWs 19 may include high capacity earth stations with connectivity to ground telecommunications infrastructure. SGWs 19 may be communicatively connected to RFT 16 and other RFTs (not shown). RFT 16 may be the physical equipment responsible for sending and receiving signals to and from satellite 12, and may provide air interfaces for SGWs 19/IGMs 18.

Satellite 12 may be any suitable communication satellite. For example, satellite 12 may be a bent-pipe design geostationary satellite, which can accommodate innovations and variations in transmission parameters, operating in the Ka-band, Ku-band or C-band. Satellite 12 may use one or more spot beams as well as frequency and polarization reuse to maximize the total capacity of satellite network 10. Signals passing through satellite 12 in the forward direction may be based on the DVB-S2 standard (ETSI EN 302 307) using signal constellations up to and including at least 32-APSK. The signals intended to pass through satellite in the return direction from satellite terminal 100 may be based on the Internet Protocol over Satellite (IPoS) standard (ETSI TS 102 354). Other suitable signal types may also be used in either direction, including, for example higher data rate variations of DVB-S2.

IPGWs 20 may be an ingress portion of a local network. IP traffic, including TCP traffic originating from a host 40 from the internet, may enter an SGW 19 through IPGWs 20. SGW 19 may be connected to an internet through IPGWs 20. Multiple IPGWs may be connected to a single SGW. The bandwidth of RFT 16 and other RFTs (not shown) may be shared amongst IPGWs 20. At each of IPGWs 20, real-time (RT) and NRT traffic flows may be classified into different priorities. These traffic flows may be processed and multiplexed before being forwarded to priority queues at SGW 19. RT traffic may go directly to an RT priority queue of SGW 19, while NRT traffic flows may be serviced based on the respective priority and volume. Data may be further packed into DVB-S2 code blocks and stored in a code block buffer before transmission. IGMs 18 may be bandwidth controllers running bandwidth allocation algorithms. The IGMs may manage bandwidth of satellite terminal 100 and other terminals in the form of inroute groups (IGs), based in part on bandwidth demand requests from the remote terminals Data from an internet intended for satellite terminal 100 may be in the form of IP packets, including TCP packets and UDP packets, or any other suitable IP packets, and may enter a SGW 19 at any one of IPGWs 20. The IP packets may be processed and multiplexed by SGW 19 along with IP packets from other IPGWs, where the IPGWs may or may not have the same service capabilities and relative priorities. The IP packets may be transmitted to satellite 12 on forward uplink 23a using the air interface provided by RFT 16. Satellite 12 may them transmit the IP packet to the satellite terminal 100 using forward downlink 23b. Similarly, IP packets may enter the network via satellite terminal 100, be processed by the satellite terminal 100, and transmitted to satellite 12 on return uplink 25b. Satellite 12 may then send these inroute IP packets to the IGMs 18/IPGWs 20 using return downlink 25a.

Satellite terminal 100 may connect to the Internet or other network through satellite 12 and IPGWs 20/SGW 19 and provide access to the Internet or other network to one or more user devices 200 that connect to satellite terminal 100. In particular, satellite terminal 100 includes an internet modem via which all network packets flow. For example, satellite terminal 100 may provide IP address and other assignments via the dynamic host configuration protocol (DHCP), and respond to requests for renewal and updates; respond to Address Resolution Protocol (ARP) requests for any IP address on the local subnet in instances where terminal 100 serves as the gateway to the internet; carry unicast IP (TCP and UDP) packets to the space link; carry multicast UDP/IP packets to the space link if enabled; accept IP packets directed to its local IP address (e.g., for WebUI); and perform other functions. In some implementations, the satellite terminal 100 may be a satellite terminal of a customer's premise, including a modem. In other implementations, the satellite terminal 100 may be implemented as a modem with integrated transmit/receive circuitry mounted on a mobile platform. In some implementations, the satellite terminal 100 may be implemented as a community WiFi terminal that includes a modem and a WiFi router. The community WiFi terminal may provide service to multiple households or to users visiting a community access site (e.g., a coffee shop).

In some implementations, satellite terminal 100 may include a satellite indoor unit (IDU) communicatively coupled to a satellite outdoor unit (ODU). The satellite IDU may include a modem, and the satellite ODU may include a radio frequency unit (RFU) and antenna. The RFU may include an upconverter for upconverting signals received from the satellite IDU. For example, the upconverter may be used in the transmission of satellite inroute signals via the antenna by frequency upconverting an IF signal received by the RFU from the modem. The upconverter may amplify the signal. The frequency upconverted (and amplified) signal may be sent to the antenna, which may focus the signal into a narrow beam for transmission to a satellite. In some implementations, the upconverter may be mounted on the antenna. For example, the upconverter may be a block upconverter (BUC) mounted on a dish. The antenna may be any suitable antenna design (e.g., small aperture parabolic antenna design) configured to transmit and receive electromagnetic signals to and from one or more satellites.

The one or more user devices 200 may include any user device that is provided access to the Internet or other network by a satellite modem of satellite terminal 100. For example, the one or more user devices 200 may be a laptop, a desktop computer, a router, a tablet, a smartphone, a smart television, a smart home device, etc. A user device 200 may transmit packets to or receive packets from a modem of satellite terminal 100. The user device 200 may wirelessly couple to the modem (e.g., over WiFi) or communicatively couple to the modem of the satellite terminal 100 over an ethernet cable.

In some implementations, the satellite modem may comprise an integrated router. In other implementations, the satellite modem may communicatively couple to a router that receives packets from the user devices 200.

Figure 2:
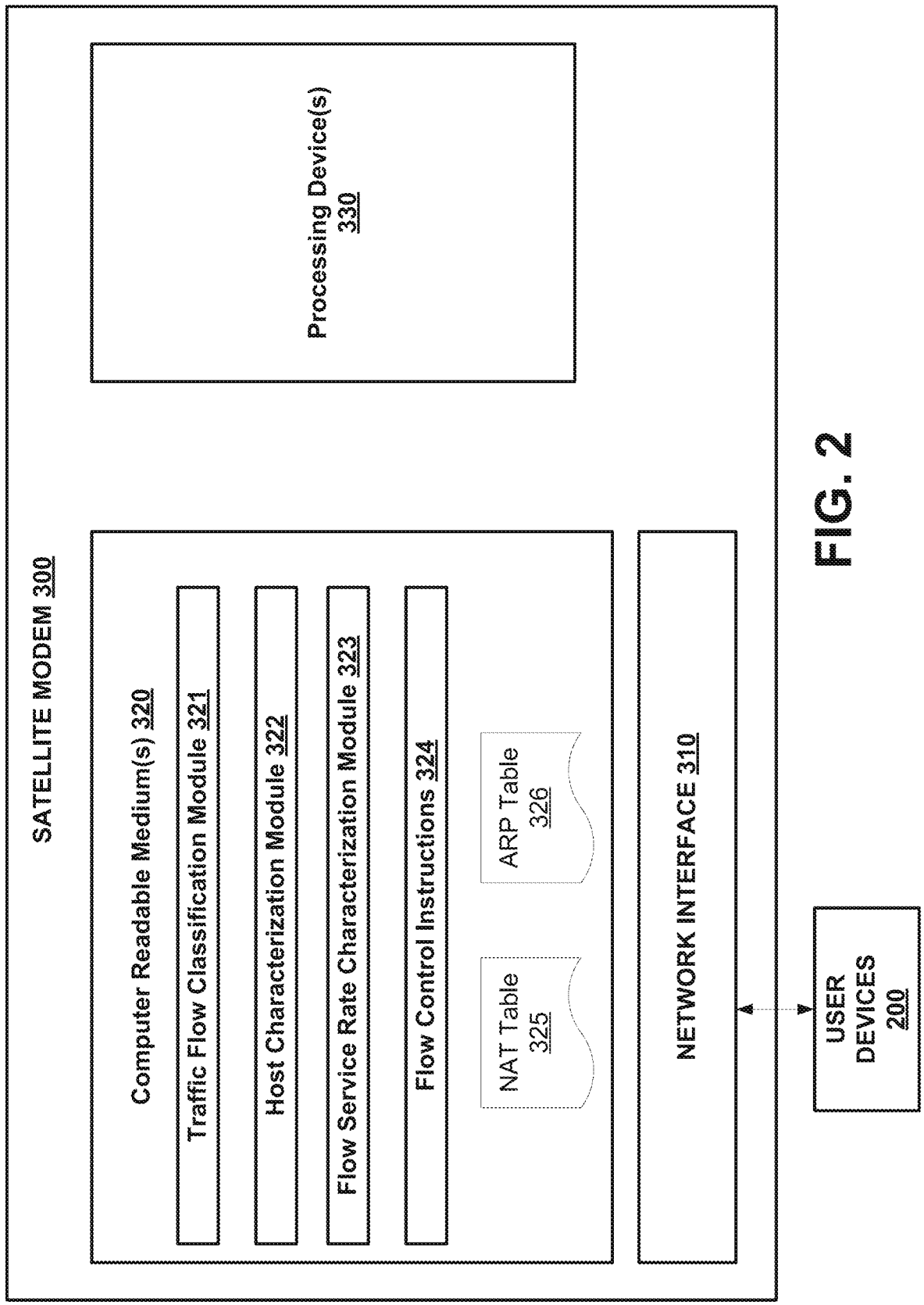
FIG. 2 is a block diagram illustrating some components of a satellite modem, in accordance with implementations of the disclosure.

FIG. 2 is a block diagram illustrating some components of a satellite modem 300, in accordance with implementations of the disclosure. As depicted, satellite modem 300 includes a network interface 310 (e.g., WiFi and/or Ethernet) for communicatively coupling to user devices 200, one or more computer readable mediums 320, and one or more processing devices 330. For simplicity of discussion, other possible components of satellite modem 300 are excluded from FIG. 2. For example, satellite modem 300 may also comprise components for communicatively coupling it to a satellite communication network (e.g., as part of an IDU/ODU configuration). Satellite modem 300 may also, in some instances, comprise satellite TX circuitry and satellite RX circuitry. For example, satellite TX circuitry may apply functions for transmitting data (e.g., user data appearing at the local Ethernet connection destined to the satellite link) such as forward error correction (FEC) encoding, bit-to-symbol modulation, transmit pulse-shaping, carrier signal modulation, and other satellite transmission functions. Satellite RX circuitry may provide functions to a satellite receive signal such as carrier down conversion, receive pulse-shaping, symbol-to-bit decoding, and other satellite receiver functions.

The computer readable medium(s) 320 include a traffic classification module 321, a host characterization module (HCM) 322, a flow service rate characterization module (FSCM) 323, flow control instructions 324, network address translation (NAT) table 325, and ARP table 326.

In this example, satellite modem 300 comprises an integrated router. As such, satellite modem 300 is directly communicatively coupled to user devices 200 via network interface 310. For example, satellite modem 300 may form a home local area network (LAN) with user devices 200. By virtue of having an integrated router, modem 300 may uniquely identify user devices 200 and their associated traffic flows by accessing NAT table 325 and ARP table 326. User devices 200 may be uniquely identified by their MAC address for both NAT-ed IPv4 traffic and IPv6 traffic.

In particular, the ARP table 326 may store a mapping between the IP addresses and MAC addresses of user devices 200. For each connection or traffic flow associated with a given user device 200, NAT table 325 may maintain a pairing of the user device's private IP address with destination IP address and port. This pairing may be referred to as a connection. Each user device 200 may have multiple active connections. As such, using entries of NAT table 325, data packets may be pushed to the public network (e.g., Internet), to its intended host destination IP address. If a data packet comes in from the public network, its source IP address may be changed to the target device's private IP address, then pushed to the appropriate user device 200.

In alternative implementations, user devices 310 may directly communicatively couple to a separate router device that connects to satellite modem 300 via network interface 310. In such implementations, although user devices 200 may not be identified using their unique MAC addresses for IPv4 traffic, in implementations, further discussed below, a user device 200 may be identified via a predominant service it is used for. For example, the device may be identified via the characteristics of the traffic flows it sends or receive, or the destination address of its traffic flows.

The modules 321-323 may include one or more sets of instructions that may be executed by one or more processing device(s) 330 to perform functions in accordance with the disclosure. In some implementations, the modules 321-323 (and flow control instructions 324) may be combined into a single module or set of instructions that governs traffic classification, traffic scheduling, and/or other functions. The functions of modules 321-323 are further described below.

Traffic flow classification module 321 is configured to classify traffic flows into traffic classes. To understand the operation of flow-based classification module 321, it is instructive to consider the example of Hypertext Transfer Protocol Secure (HTTPS), which refers to an extension of the Hypertext Transfer Protocol (HTTP) that provides secured communications over a computer network by encrypting the communication protocol using Transport Layer Security (TLS). Port 443 is typically used for HTTPs traffic. HTTPs is becoming prominent not only for conventionally secured transactions such as online banking, but also for social media or video-sharing applications where privacy needs to be considered (e.g., FACEBOOK or YOUTUBE). As a result, banking traffic and video streaming traffic may both utilize port 443. However, if port 443 is the only criteria used to classify a traffic type into a higher priority, then ongoing video flows may slow down online banking traffic, especially when the network is congested. Thus, to provide improved traffic classification, there is a need to differentiate the traffic of online banking and video streaming using other characteristics of traffic flows.

Figure 3A:
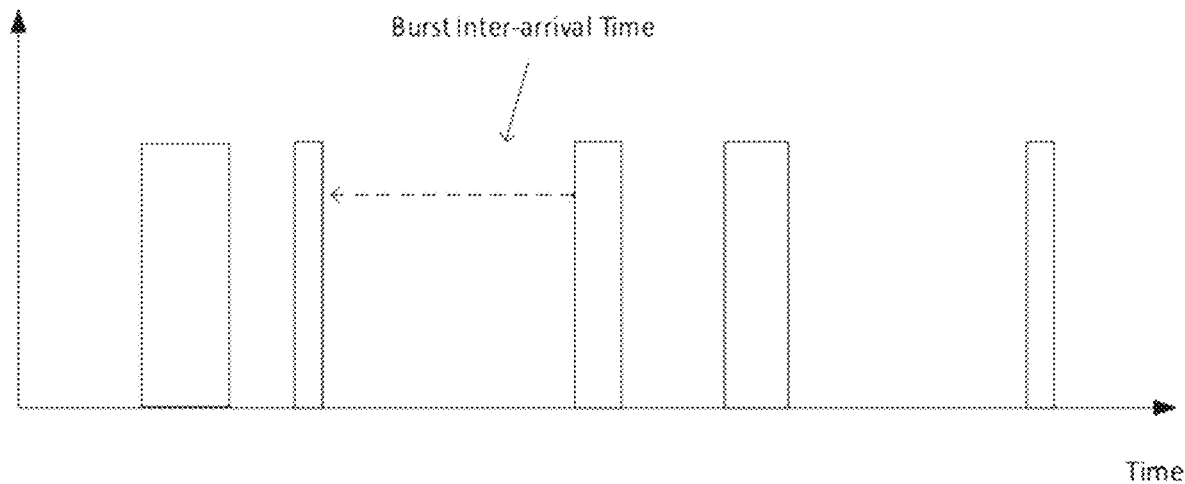
FIG. 3A depicts an example waveform illustrating the random nature of webpage interactive traffic over time.

In implementations, traffic flow classification module 321 is configured to classify traffic flows by statistically profiling them based on their use of bandwidth over time. This profiling technique may consider, for example, the frequency and size of traffic bursts, where traffic bursts refer to group of data packets with small inter-arrival gaps as compared to burst inter-arrival time. To illustrate, consider traffic bursts for different types of network traffic. FIG. 3A depicts an example waveform illustrating the random nature of webpage interactive traffic over time. In the case of normal web browsing, traffic bursts are interleaved with random inter-arrival times. For instance, consider a user that sends a webpage request (e.g., using HTTP or HTTPs protocol) to a server that responds with a group of packets. On receiving a response, the user may send another request to continue the interaction. In this scenario, the burst inter arrival time, which is based on user interaction, is random.

Figure 3B:
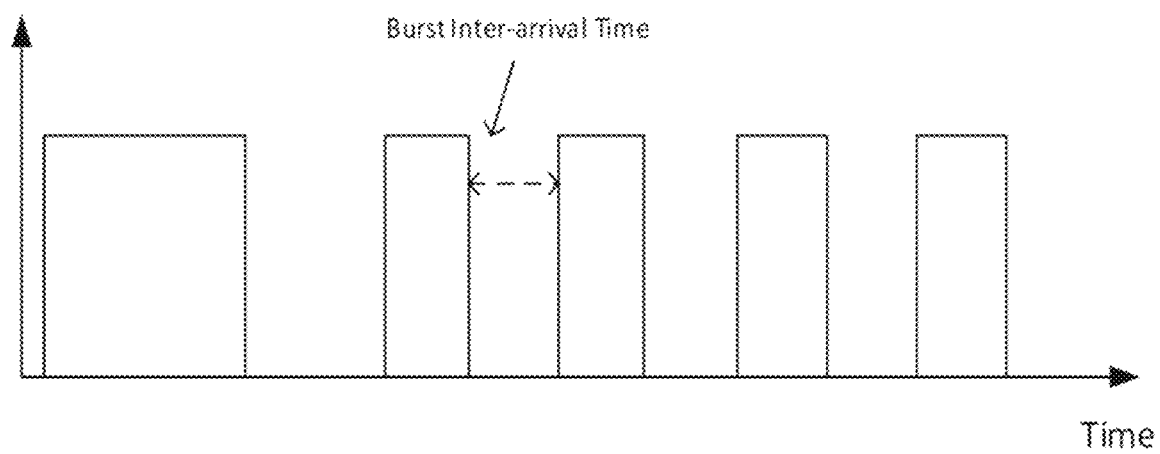
FIG. 3B depicts an example waveform illustrating a video streaming traffic session over time.

FIG. 3B depicts an example waveform illustrating a video streaming traffic session over time. In the case of a video streaming session, a software program on the user's client device initiates video playback by sending a HTTP or HTTPs request to the server for downloading video content. The server typically sends a large burst of data in the beginning to fill up the playback buffer of the client up to a certain threshold (e.g., based on the video quality and network conditions). Thereafter, the server sends video data only at the rate needed to support video playback. In this instance, the burst interarrival is nearly constant as compared to a random arrival in the case of web browsing.

As the foregoing examples illustrate, inter burst arrival time and burst sizes may be used to differentiate traffic flows. For example, by considering inter burst arrival time, web browsing flows may be differentiated from video streaming flows. By considering the burst size, a short video clip may be differentiated against a movie or longer video clip.

As such, with statistical classification, the profile of a traffic session may be captured to determine what traffic class the traffic session belongs to. In implementations, a traffic profile may include the following five statistical characteristic metrics: average throughput, session duration, ON/OFF duration, ON/OFF ratio, and maximum throughput rate. The average throughput is the throughput rate from the start of a session to the time it is measured. The session duration may refer to the duration from the start of a traffic session to the time it is measured. ON duration may refer to the accumulated time that has data for a traffic session. OFF duration may refer to the accumulated time that has no data for a traffic session. The ratio of time in between may refer to the ON/OFF ratio. The maximum throughput rate may refer to the highest rate measured during a certain sampling period of a session.

In implementations, traffic flows may be considered as real-time (RT) and non-real-time (NRT) types. Real-time traffic flows may refer to traffic that has a strict delay and jitter characteristics like a voice or video conversations. These traffic flows may be assigned the highest priority with guaranteed bandwidth. RT traffic flows may be classified using other mean besides profiling. For example, Voice over IP (VOIP) may be setup by identifying the flow with a SIP Proxy mechanism and appropriately creating the VoIP call RT flows before the start of the call.

In implementations, NRT traffic flows may be classified via profiling. NRT traffic flows may refer to traffic flows such as interactive traffic, streaming traffic, and bulk traffic. An interactive flow may be characterized as a non-real-time flow that involves user interaction. For example, it may refer to web browsing, online gaming, online banking, etc. Because these traffic flows have a strong element of user interaction, they may be classified as an interactive service class with a higher priority than the other two non-real-time priorities, and has lower latency when compared to the other two service classes. A streaming traffic flow may have a lower (i.e., less stringent) latency requirement than the transactional traffic flow because the streaming application typically fills up a large buffer before playback. A bulk traffic flow may be delay tolerant, and hence be assigned the lowest priority traffic class. In implementations, with statistical classification, a few boundaries may be set for interactive, streaming and bulk traffic based on a few statistical characteristics. Afterward, based on the captured profile of a traffic session, what class the session belongs to may be determined.

In some implementations, traffic flow classification module 321 or another module of computer readable medium(s) 320 may be configured to characterize the typical traffic patterns or traffic flows associated with a user device. This characterization may be utilized by the system to identify devices that are behaving out of their intended use/norm. For example, consider the case of Internet of Things (IoT) devices that act autonomously with no user interaction. One such device may be a smart solar panel that uploads a batch of data once a day to a centralized server regarding information related to power usage. If the solar panel is compromised by a computer virus, the virus may launch a Denial of Service attack by transmitting large amounts of data at all times of the day to some Internet host. The module may be utilized to recognize this new traffic pattern (i.e., bigger upload rates for longer periods of time) and alert the user (e.g., through a web interface) that the device is acting out of the norm and that something may be wrong.

Figure 4:
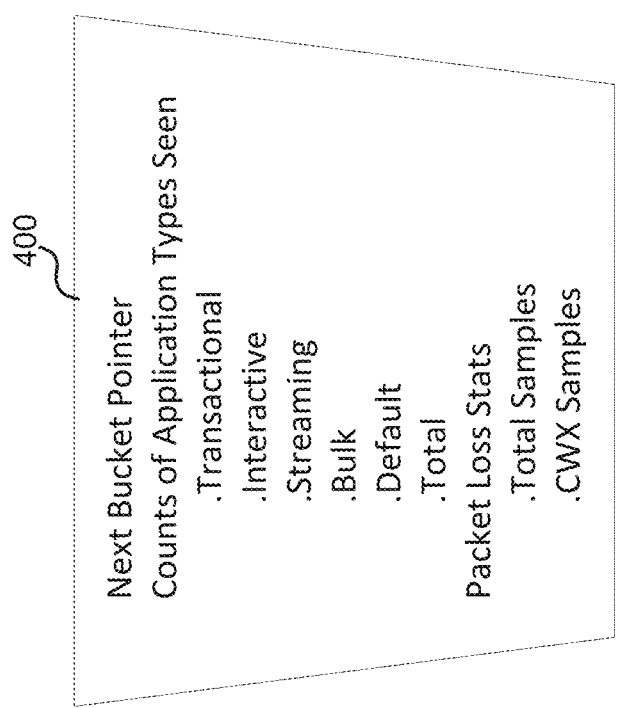
FIG. 4 illustrates a bucket for storing counts of application types seen and packet loss statistics of a host over a time window, in accordance with implementations of the disclosure.

HCM 322 is configured to implement a traffic flow analyzer for each local host (e.g., associated with each user device 200) to classify each TCP connection application type seen, and count the number of application types of each TCP connection application type seen. In some implementations, traffic flows may be analyzed both for local hosts associated with user devices 200 and remote hosts (e.g., host 40) communicating with user devices 200. Each time a new TCP connection application type is detected for a host, a counter associated with the application type may be incremented. These statistics may be stored in a number of data structures, referred to herein as "buckets," that cumulatively represent a configurable tracking time window (e.g., seconds, minutes, hours, or days) for the host. These data structures may be of configurable size (e.g., in seconds). A conceptual illustration of a bucket 600 is shown in FIG. 4, which stores counts of application types seen along with packet loss statistics. As illustrated in the implementation of FIG. 4, HCM 322 may classify TCP connections as belonging to one of five application types or categories: transactional; interactive; streaming; bulk; or default. A transactional application type may correspond to TCP connection having a short connection time (e.g., a few bytes of data such as instant messages). An interactive application type may correspond to a TCP connection such as web browsing. A streaming application type may correspond to a TCP connection that carries streaming video or audio data. A bulk application type may correspond to a TCP connection that carries a large amount of data (e.g., file transfer of a movie, video game, or other large file). A default application type may correspond to a TCP connection that cannot be identified as having a particular classification.

It should be noted that although the TCP application types described herein are primarily described with reference to these five aforementioned application types, these TCP application types are exemplary and other categorizations may be used. For example, the grouping or number of application types may vary. Particular methods of classifying TCP connections are further described in U.S. patent application Ser. Nos. 15/344,684 and 15/348,837, which are incorporated herein by reference.

Figure 5:
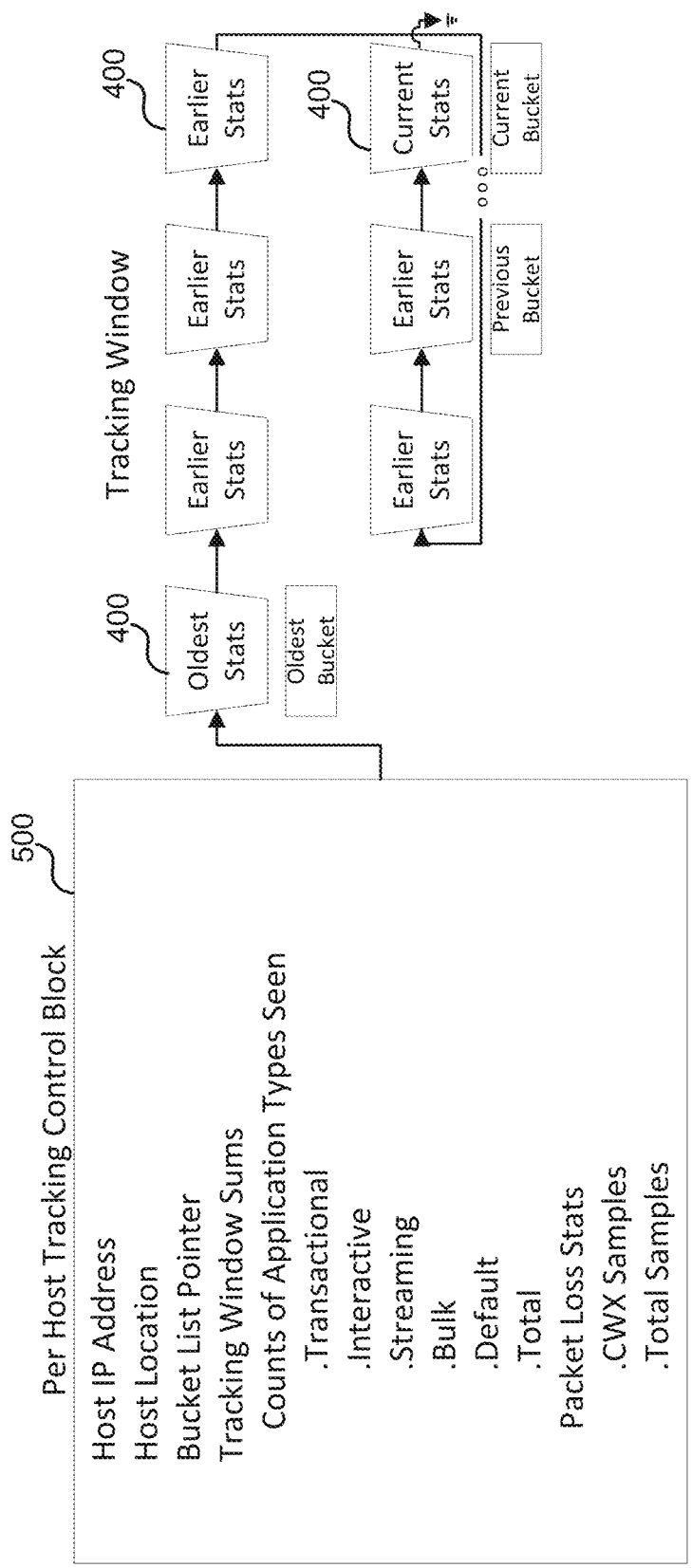
FIG. 5 illustrates a tracking control block of a host having a tracking window including a plurality of recent tracking buckets, in accordance with implementations of the disclosure.

In one implementation, for each host a data structure may be used to store accumulated statistics from all buckets and an identification of the host. This data structure may be referred to as a "tracking control block." This is illustrated by FIG. 5, which illustrates a tracking control block 500 of a host having a tracking window including a plurality of recent buckets 400. As illustrated, the host tracking control block 500 stores counts of application types seen and packet loss statistics over the tracking window for the host. Additionally, the host tracking control block 500 stores a Host IP Address, a Host Location (i.e., whether the host is local or remote), and a bucket list pointer. As previously noted, the number of recent buckets (i.e., tracking window size) may be configurable and depend on the type of host (e.g., local versus remote host). Different size buckets and tracking windows may be used for local and remote hosts because local hosts may change which applications they are using relatively quickly whereas remote (e.g., Internet) hosts are generally dedicated to a specific set of applications. For a current bucket 400, each time a statistic is incremented, the corresponding stat is also incremented in the tracking control block 500.

Figure 6:
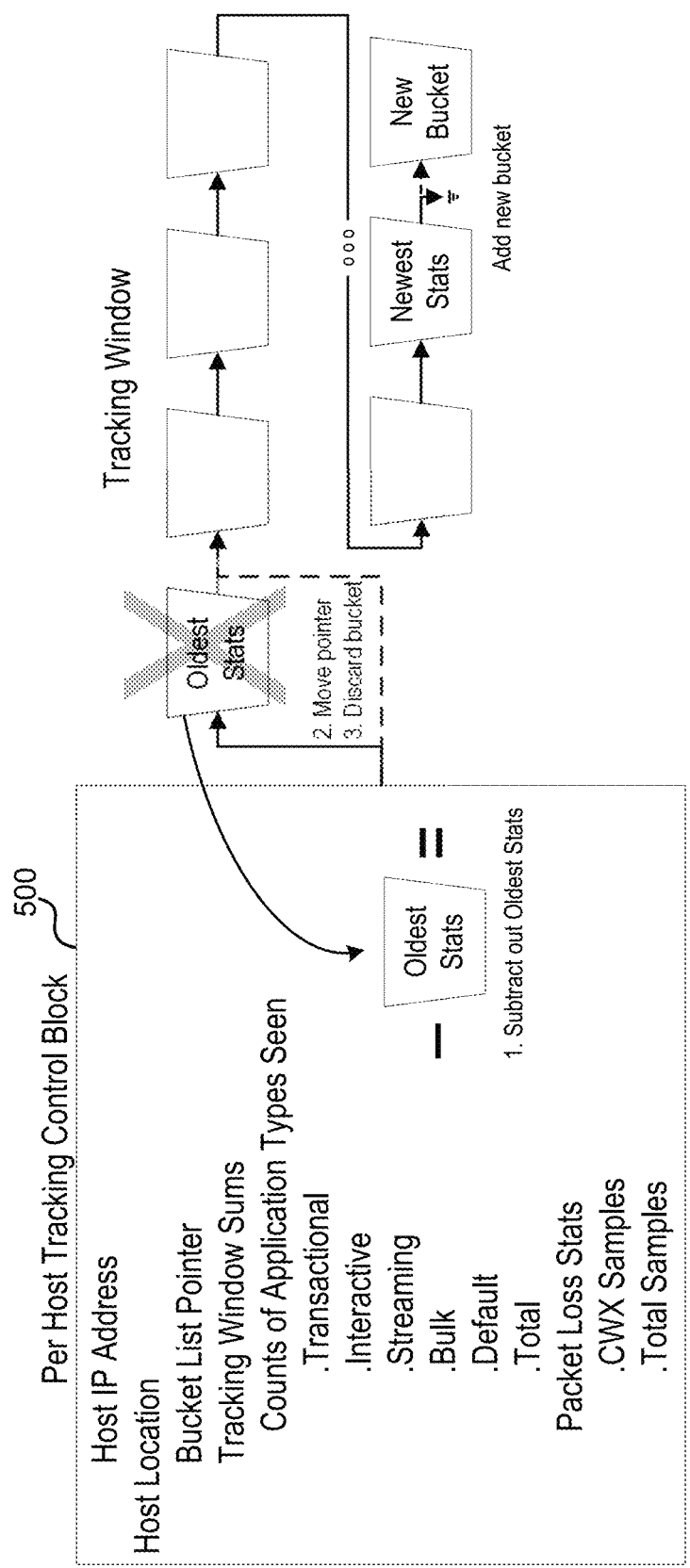
FIG. 6 illustrates a process of creating a new tracking bucket for the tracking control block of FIG. 5, in accordance with implementations of the disclosure.

In the example implementation of FIG. 5, when a current statistics bucket reaches its time limit, a new tracking bucket is created and added to the end of the tracking window. This process is illustrated by FIG. 6. As shown, if the tracking window is full (i.e. the tracking window already has the maximum number of buckets), tracking control block 500 may be updated such that at the same time the new bucket is added, the counts from the oldest bucket are subtracted from the tracking control block 500, the oldest bucket is discarded, and the bucket list pointer is updated. Additionally, packet loss statistics from the oldest bucket are removed.

HCM 322 may periodically calculate a recent dominant host application type (RDHAT) for each host at different target periods (e.g., during a busy period, non-busy period, idle period) using the historical data gathered via the tracking control blocks. By doing this, device characteristics may be determined at different target periods. Based on the device characteristics determinations, flows originating from the device at a particular time period may be more appropriately classified such that the appropriate bandwidth allocation may be triggered just in time for the flow so that the jitter and delay characteristics may be greatly improved.

Implementations described below are directed to the derivation of a Recent Dominant Host Application Type (RDHAT) value, which returns the mostly frequently used recent application type by a host.

Following the above example application categorization of FIGS. 4-6, when the HCM 322 is called to request information about two hosts involved in a TCP connection, the value returned may be one of: Transactional; Interactive; Streaming; Bulk; Default; Mixed; Not Enough Samples; or Unknown. In the case of Unknown, HCM 322 may have no entry in its database for either of the specified host IP addresses. In the case of Mixed, HCM 322 may have an entry for at least one of the hosts in its database, but not one type of application meets the criteria to be defined as dominant. In the case of Not Enough Samples, HCM 322 may have an entry in its database for at least one of the hosts but not have enough samples to make a reasonable application type judgment. In the case of Default, an application type determination may not have been made for either of the hosts.

Figure 7:
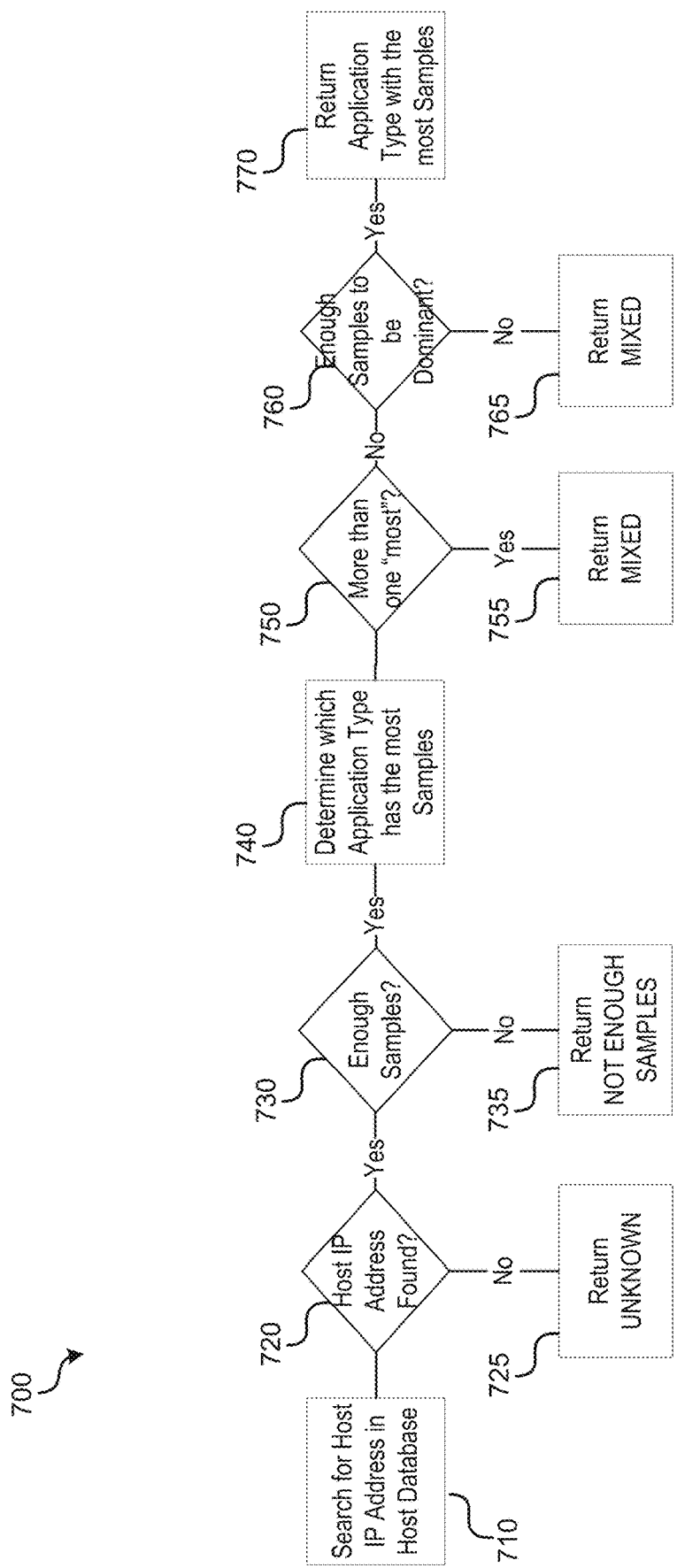
FIG. 7 is an operational flow diagram illustrating an exemplary method of determining a recent dominant host application type value, in accordance with implementations of the disclosure.

FIG. 7 is an operational flow diagram illustrating an exemplary method 700 of determining a RDHAT value, in accordance with implementations of the disclosure. Prior to implementing method 700 satellite modem 200 may receive an IP message including a TCP segment from a local host, determine an IP Address of the local host (and optionally, the remote host), and query HCM 322 for the RDHAT value of the local host and/or the remote host. At operation 710, HCM 322 may search for the host IP Address in a database. If the host IP Address is not found (decision 720), HCM 322 may return an Unknown value at operation 725.

Otherwise, if the host IP address is found (decision 720), at decision 730 HCM 322 may determine if there are enough application type samples. In implementations, a configurable, minimum number of connection samples within a tracking window (e.g., the tracking window illustrated by FIG. 5) may be required to calculate a valid RDHAT. For example, a default value of 10 may be set. If fewer than the minimum number of connection samples have been seen for the host within a tracking window, at operation 735 a Not Enough Samples RDHAT value for the host may be returned.

Otherwise, if there are enough application type samples, at operation 740 a determination is made as to which application type has the most samples (i.e., counts). At decision 750, it is determined if there are two or more application types that have the same value for the most entries. If there are, at decision 755 a Mixed application type value may be returned. Otherwise, at decision 760 a determination is made as to whether there are enough application type samples to be dominant. In implementations, this determination may be made by dividing the connection application type with the highest count by the total number of each TCP connection application type seen for the remote host over the second time window; and value is greater than or equal to the threshold, then the connection application type may be considered dominant and returned at operation 770 as the host's RDHAT for the current time window. Otherwise, if the value is less than the threshold, at operation 755 a Mixed value may be returned.

Figure 8:
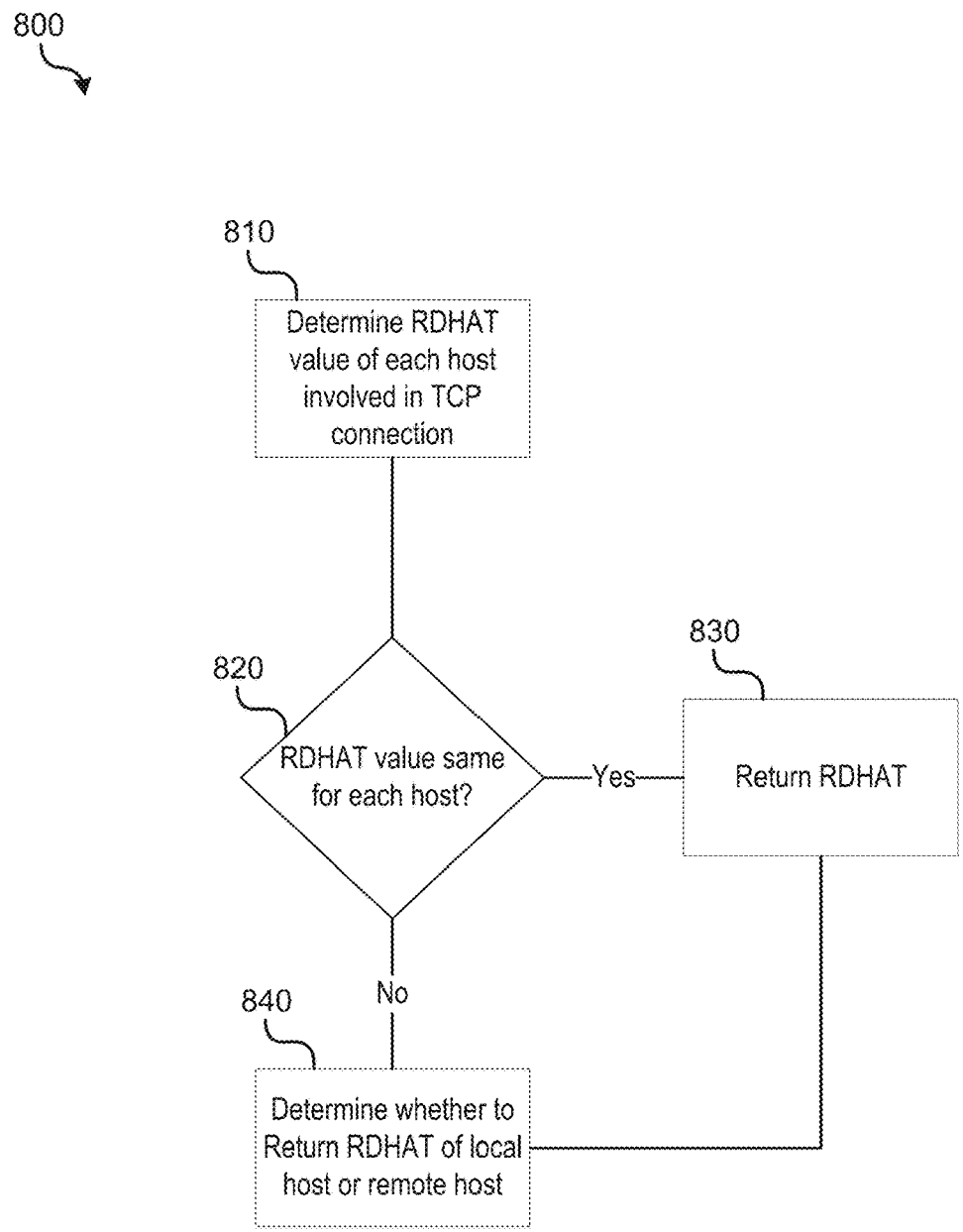
FIG. 8 is an operational flow diagram illustrating an example method for calculating a final recent dominant host application type value when a recent dominant host application type value is calculated for both a local host and a remote host, in accordance with implementations of the disclosure.

As noted above, in some implementations, a RDHAT value may be calculated for both the local host and remote host. FIG. 8 is an operational flow diagram illustrating an example method 800 for calculating a final RDHAT value when an RDHAT value is calculated for both the local host and remote host. At operation 810, a RDHAT value may be calculated for both the local host and remote host following the process of method 700. At decision 820, it is determined whether the RDHAT value is the same for each host. If the RDHAT value is the same, then at operation 830 the RDHAT value shared by the hosts may be returned. However, in some instances, the RDHAT value may not be the same for the local host and the remote host. In such cases, one option would be to return a Mixed RDHAT value when the two values do not agree. However, a more intelligent estimate may be provided by choosing between the RDHAT value of the local host or remote host (operation 840). In one implementation, the choice may be based on a confidence level determined by the number of samples available for each host and/or the percentage of samples of each host that of the dominant application type. Alternatively, in another implementation, the more conservative RDHAT value between the two may be chosen.

The FSCM 323 is configured to track per device information related to the local network packet draining characteristics of the user device 200. Particularly, FSCM 323 is configured to determine a maximum rate at which a user device can receive data. In this manner, FSCM 323 may ensure that enough packets are buffered to support the throughput requirement of the device to meet the service level agreement (SLA) and to ensure that the slow draining devices do not hog buffer resources that affects the effective throughput of the other devices connected to the modem. The FSCM 323 may be utilized to remember the rate at which each device can receive data, such that hosts on the internet are rate-limited to send data to the device at a rate at which the device can consume the data.

To understand the operation FSCM 323, it is instructive consider the problems that may arise when there is a "slow device." In such a scenario, the traffic originating from the Internet and destined for the slow device may be coming into the modem at a high rate. If the slow device is draining the traffic at a slower rate than which it is coming into the modem, the traffic needs to be buffered in the modem. However, because of the limited memory resources that may be available in the modem, this buffering operation may come at the expense of other devices. By queueing more data for the slow device, there may be less less available buffer resources for the other devices. By implementing FSCM 323 to remember the maximum rate at which a device can receive data, an attempt may be made to match the rate at which the Internet host is sending traffic to avoid unnecessary buffering at the modem (e.g., through methods such as TCP window size adjustment, implemented on the IPGW).

Like the HCM 322, the FSCM 323 may maintain the flow rate per device statistics in bucket data structures. Both the short term (e.g., 30 minutes, hour, a few hours, etc.) and long term (e.g., 5 days, 7 days, 9 days, etc.) statistics may be maintained and used for the classification of the flow from a particular device. FSCM 323 may use the historical data pertaining to a flow from a particular device to predict the service type of the connection. For example, a flow from an IoT device may be differentiated against a web browsing session even though both devices use the same type of connection (e.g., TCP) and possibly the same port number (e.g., port 443).

Figure 9:
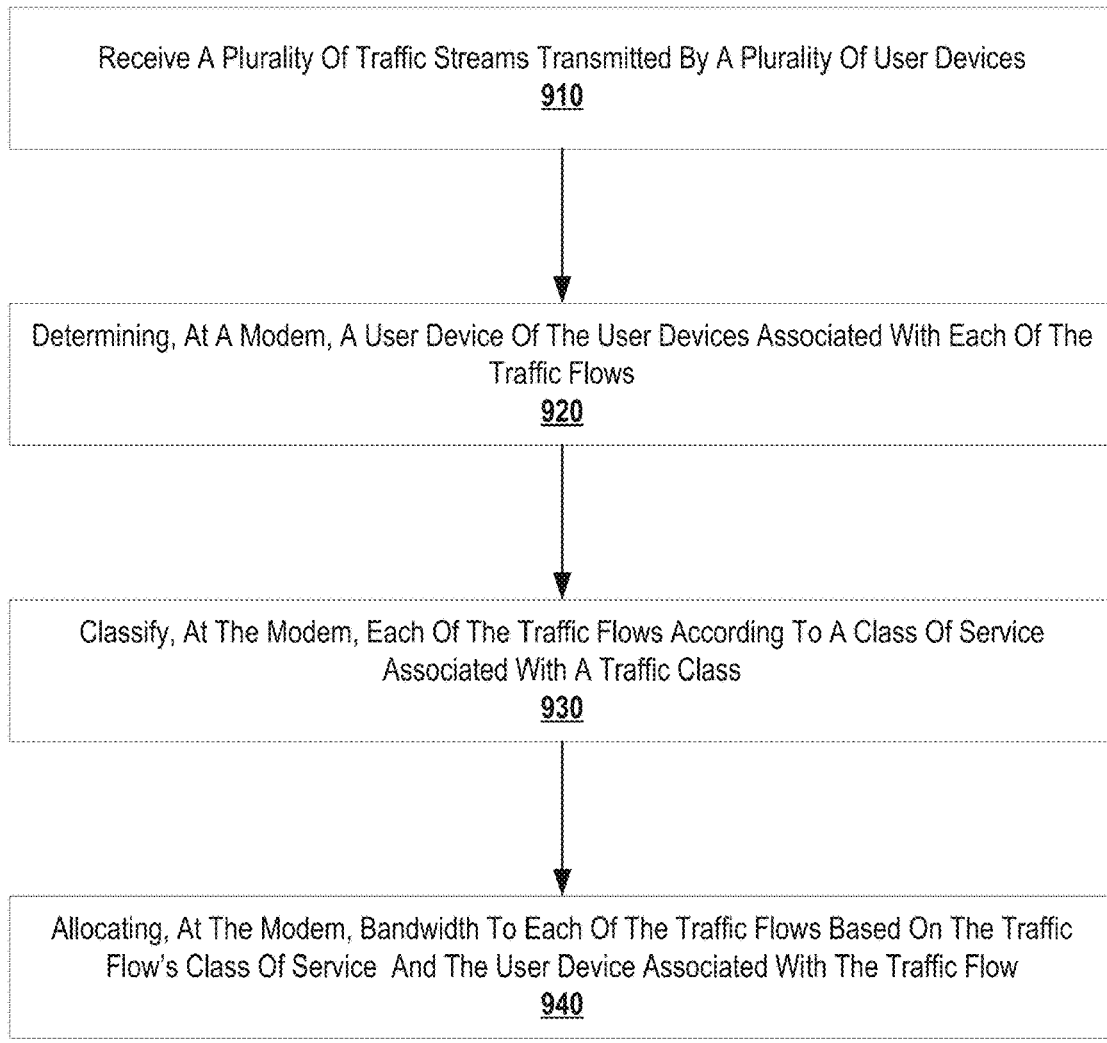
FIG. 9 is an operational flow diagram illustrating an example flow control method of utilizing a modem to allocate bandwidth to traffic flows based on the traffic flows and characteristics of the user devices associated with the traffic flows, in accordance with implementations of the disclosure.

FIG. 9 is an operational flow diagram illustrating an example flow control method 900 of utilizing a modem to allocate bandwidth to traffic flows based on the traffic flows and characteristics of the user devices associated with the traffic flows, in accordance with implementations of the disclosure. For example method 900 may be implemented by modem 300 executing flow control instructions 324. In some instances, modem 300 may also execute instructions associated with one or more of traffic flow characterization module 321 and HCM 322. Method 900 will be described with reference to FIG. 10, which illustrates a queuing structure that may be utilized at the modem to provide flow control.

Figure 10:
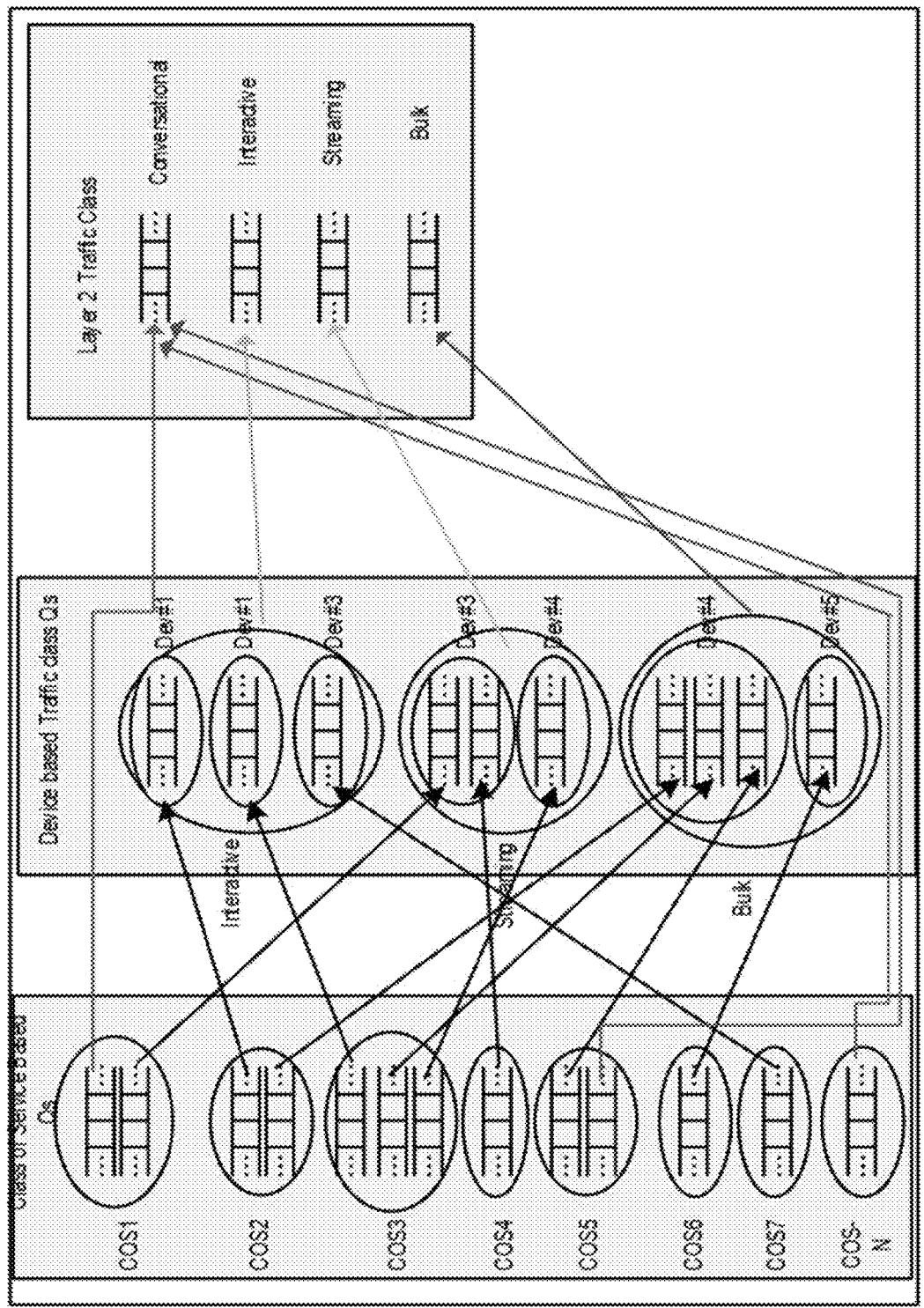
FIG. 10 illustrates a queuing structure that may be implemented at a modem to provide flow control, in accordance with implementations of the disclosure.

At operation 910, a plurality of traffic flows transmitted by a plurality of user devices are received. For example, as depicted by FIG. 10, the modem may receive traffic flows from five different user devices. Some of the user devices may transmit multiple traffic flows. In implementations where the router is a separate device from the modem, the traffic flows may be received by the router and subsequently forwarded to the modem.

At operation 920, the modem determines a user device of the user devices that is associated with each of the traffic flows. In some implementations, a modem 300 may determine a source IP address and/or destination IP address of each of the traffic flows, and using NAT table 325 and/or ARP table 326, map the traffic flow to a particular user device 200.

At operation 930, the modem classifies each of the traffic flows according to a class of service associated with a traffic class. For instance, as depicted in the example of FIG. 10, the modem classifies traffic in four different priority classes (Conversational, Interactive, Streaming and Bulk). Each class of service may be associated with a traffic class via a previously established configuration (e.g., into one of the four traffic classes discussed above).

In some implementations, traffic flows may be classified based on the incoming traffic characteristics (e.g., profile) using traffic flow classification module 321. For example, traffic flows may be classified based on their inter burst arrival time and burst sizes. In particular implementations, traffic flows may be classified by determining a traffic profile including: average throughput, session duration, ON/OFF duration, ON/OFF ratio, and maximum throughput rate.

In some implementations, traffic flows are classified using the HCM 322 described above. In some implementations, HCM 322 may be used to classify a traffic flow based on a remote host's RDHAT. For example, consider a device that repeatedly establishes a connection to a file-sharing web server. By observing from the recent history of the device that the remote host's RDHAT is Bulk, the traffic flow may be immediately classified as bulk without having to wait for traffic flow classification module 321 to determine the classification (e.g., by sampling burst inter-arrivals, which takes time). In some implementations, HCM 322 may be used to classify a traffic flow based on a local host's RDHAT. For example, consider a smart TV that is connected to the modem and establishes a connection to a previously unseen remote host. By observing that the TV's RDHAT is Streaming, the traffic flow may be assigned to the Streaming traffic class. In some implementations, HCM 322 may be used to classify a traffic flow based on both a remote host's RDHAT and a local host's RDHAT as described above with respect to method 800.

In some implementations, each traffic flow is classified based on the four tuple: source IP address, source port, destination IP address, destination port. In some instances, a combination of the aforementioned techniques may be used to classify the traffic flows. For example, if the four tuple is insufficient to classify the traffic flow, statistical profiling may be implemented using module 321 to classify the flow.

In some implementations, current network conditions may also be considered for classifying each traffic flow. In such implementations, the boundary of the class of service used for classification purposes may depend on current network conditions. For example, in the case of a satellite backhaul network the available bandwidth may be lower due to rain fade condition, and in this case the boundary for each service class may shrink, downgrading an otherwise interactive class flow to a streaming class flow.

In some implementations a two-pass approach may be utilized for flow classification. In the first pass, a flow may be classified solely based on its profile, traffic flow behavior and/or traffic flow host based history. In the second pass, the boundary of the service class may be determined based on the network condition and the actual current traffic volume and the configured bandwidth for the service class. With this two pass scheme, enough traffic may be classified to the appropriate traffic class corresponding to the current network condition and the configured reserved bandwidth for that class.

In some implementations, any suitable combination of traffic flow classification techniques described above (e.g., using traffic flow classification module 321, HCM 322, etc.) may be utilized.

The determination of a traffic flow's CoS may be based on one or more attributes or metrics. For example, the CoS may be determined based on the device from which the flow originated. For example, a user's personal laptop may be placed on the high-priority CoS, whereas an IoT device might be placed on a low-priority CoS. Additional metrics may include the time of day when the flow was established, the destination server address, or some combination thereof.

In some implementations, CoS weights and the mappings between CoS's and traffic classes may be configured. Take an example where CoS5 and CoS6 of FIG. 10 are mapped to the Bulk traffic class with weights 80% and 20% respectively. CoS5 may be considered be the high-priority Bulk CoS whereas CoS6 may be the low-priority Bulk CoS.

At operation 940, the modem allocates bandwidth to each of the traffic flows based on the traffic flow's class of service and the user device associated with the traffic flow.

In some implementations, prior to allocating bandwidth, the traffic flows are organized on a per device basis within their determined respective traffic class. In some implementations, traffic flows belonging to the conversational class are not grouped on a device basis because the uplink bandwidth for these flows may be allocated during the flow setup phase and the flow characteristics is such that the rate is constant and predetermined.

In some implementations, bandwidth is allocated to each flow based on i) the priority or weight associated with each class of service; and ii) a priority or weight associated with each user device. For example, for flows associated with CoS having the same priority, higher priority devices or higher weighted devices may be assigned more bandwidth for their respective flow. In some implementations, the bandwidth allocated to each flow may also take into account the number of active flows associated with each device. For example, to ensure equitable distribution of bandwidth, a device having three active streaming flows may be assigned less bandwidth for each of the three streaming flows as compared to the amount of bandwidth assigned to a streaming flow associated with a device that has only one active streaming flow.

In some implementations, the priorities or weights assigned to CoS, and/or the priorities or weights assigned to user devices may be configured via a user interface that may be accessed by an administrator of the modem. For example, the administrator may access a web-based graphical user interface via a webpage (e.g., by typing in IP address 192.168.100.1 or other appropriate IP address in the web address control of a web browser). Via the user interface, the administrator may configure the aforementioned parameters. In some implementations, the parameters may be configured based on the day of the week, date, and/or time. In some implementations the user interface may identify each user device with an active connection along with active flows associated with each device. The user interface may also display classifications of the flows.

In some implementations, depicted by FIG. 10, the modem maintains layer 3 CoS queues (e.g., supporting up to 64 different class-of-services) and layer 2 priority queues (e.g., Conversational, Interactive, Streaming and Bulk queues). In this queuing structure, flow control is implemented by maintaining enough data within layer 2 and layer 3 queues, further described below, such that there is enough data for transmission, while not allowing the modem to be overwhelmed by incoming traffic. The data queued for each device may provide for equitable distribution of available bandwidth among all connected devices. In this implementation, the input to flow control may include the amount of data queued in layer 2 and layer 3 queues, as well as the over the air allocated bandwidth averaged over time. Latency metrics may be used to regulate the packet dropping rate and the window size adjustment. Incoming packets may classified as one of the CoS as specified by the various classification methods, and queued into the appropriate layer 3 CoS queue. Each of the CoS may be mapped to a layer 2 priority queue (e.g., Conversational, Interactive, Streaming and Bulk).

FIG. 11 illustrates an example method 1100 for distributing/assigning bandwidth to user flows as a function of the flow's traffic class, class of service, and the user device from which the flow originated, in accordance with implementations of the disclosure. Method 1100 may be implemented during operation 940, discussed above. Method 1100 may be implemented to assign bandwidth to user flows such that all allocated bandwidth is used, available bandwidth is distributed in such a way that lower priority traffic is not starved, and bandwidth is fairly distributed based on corresponding CoS and user device weights. FIG. 11 will be described in conjunction with FIG. 12, which illustrates one particular example implementation of method 1100.

At operation 1110, bandwidth from the total available bandwidth is distributed/assigned to each of the traffic classes associated with the traffic flows based on a configured minimum bandwidth for each of the traffic classes. In implementations, the minimum bandwidth is configured as a minimum bandwidth percentage to avoid starvation of lower priority traffic. For example, as depicted by FIG. 12, if the traffic flows comprise Interactive, Streaming, and Bulk traffic classes, the minimum bandwidth percentages may be configured such that the percentages are 20%, 20%, and 60% for Interactive, Streaming, and Bulk respectively.

Figure 12:
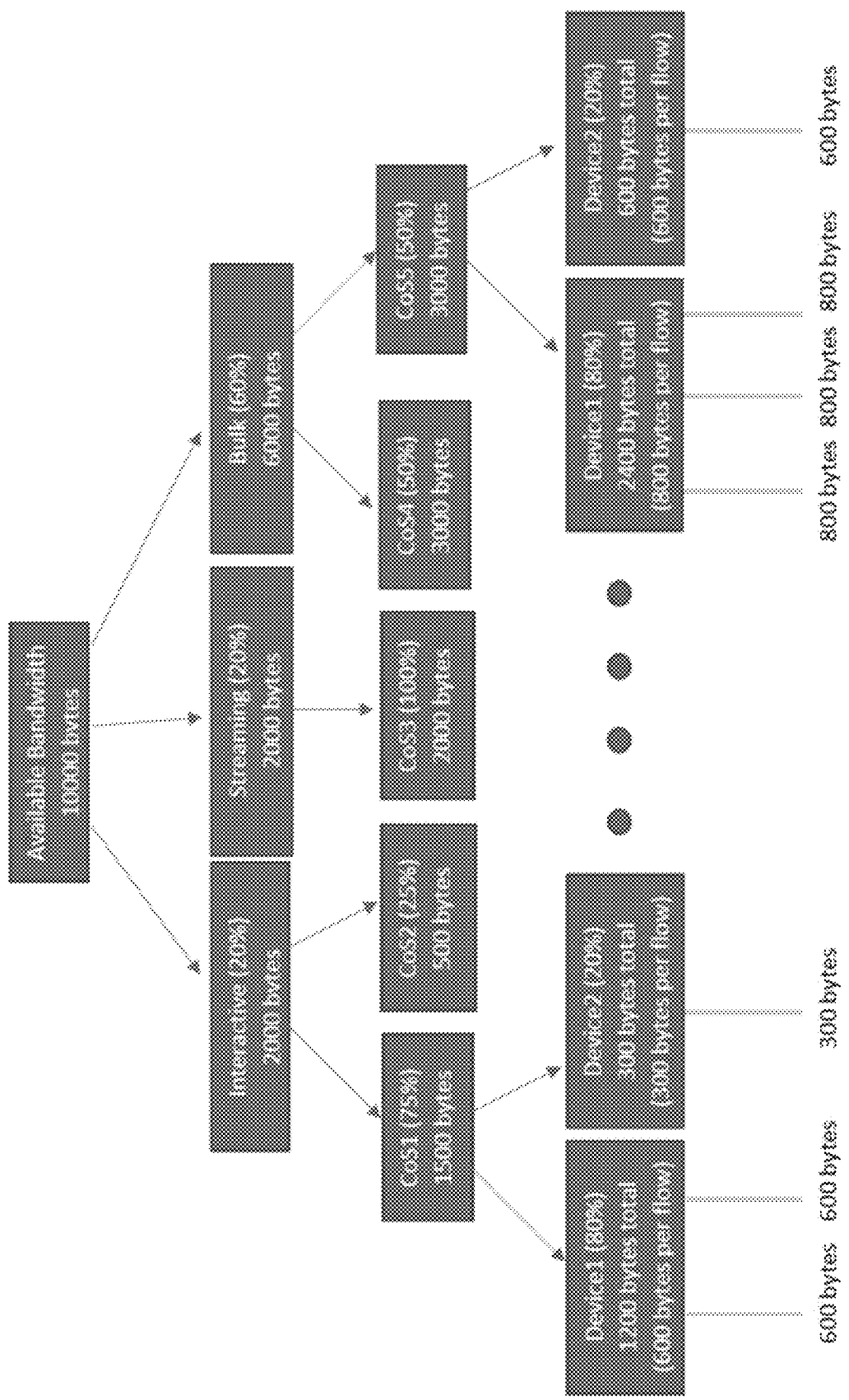
FIG. 12 illustrates one particular example implementation of the method of FIG. 11.

For example, taking $U_t(t)$ as the total available bandwidth with the minimum bandwidth percentage for traffic class i applied, in the example of FIG. 12 the Available Bandwidth=$U_1(t)+U_2(t)+U_3(t)$, where Interactive available bandwidth=$U_1(t)$, Streaming available bandwidth=$U_2(t)$, and Bulk available bandwidth=$U_3(t)$. Particular mathematical implementations of flow control algorithms for distributing available bandwidth to each of the traffic classes associated with the traffic flows are further described below.

At operation 1120, the bandwidth distributed/assigned to each of the traffic classes is distributed/assigned to the classes of services mapping to that traffic class. This distribution may be weighted (e.g., CoS1 and CoS2 in the example of FIG. 12) or equally distributed (e.g. CoS4 and CoS5 in the example of FIG. 12). If only one class of service is mapped to a traffic class (e.g. CoS3 in the example of FIG. 12), then that class of service may receive the entirety of the bandwidth assigned to the traffic class.

At operation 1130, the bandwidth distributed/assigned to each of the classes of services is distributed/assigned to each user device within each of the classes of services. Bandwidth distributed to a given CoS may be distributed to a user device based on a weight or priority to each user device. For example, as depicted in FIG. 12, Device1 is assigned 80% of the bandwidth for a given CoS and Device2 is assigned 20% of the bandwidth for a given CoS.

At operation 1140, the bandwidth distributed/assigned to each of the user devices for a given CoS is equally distributed to all flows originating from that Device/CoS combination. For example, as depicted by FIG. 12, if Device1 has two active flows sending traffic on CoS1, then each flow receives an allocation of 1200/2=600 bytes, from the total available 10000 bytes. If a device has only one active flow sending traffic on a particular CoS, then that active flow receives the full allocation for that device/CoS combination. In implementations where no user device has more than one active flow sending traffic for a given CoS, operation 1140 may be skipped.

In some implementations, bandwidth is allocated by modem 300 by using a flow-control algorithm in conjunction with a scheduling algorithm. The flow-control algorithm determines a sufficient amount of data to be queued up in Layer 2 such that the allocated uplink bandwidth is fully utilized. For example, the flow control algorithm may be used to determine, at a certain time t, that a certain amount of data may be moved into a certain traffic class (e.g. can enqueue 2000 bytes into the Interactive traffic class layer 2 queue). The scheduling algorithm may determine the amount of data to be moved from Layer 3 to Layer 2 such that all the devices within a CoS are treated equitably with respect to the device's configured weight. The scheduling algorithm may be run every time a data packet is to be sent. For example, the scheduling algorithm may be implemented as discussed above with reference to method 1100.

In some implementations, the scheduling algorithm is a two-pass scheduling algorithm that is run for each incoming data packet. During the first pass, the available allocated bandwidth is distributed to user flows as a function of the flow's traffic class, class of service, and the user device from which the flow originated, as discussed above with reference to method 1100. During the second pass, any leftover bandwidth may be distributed in a round robin scheme in strict priority order. For example, referring to FIG. 12, Device 1's allocation on CoS1 is 1200 bytes and Device 2's allocation is 300 bytes. If the flow originating from Device 2 only has 200 bytes to transmit, then the remaining 100 bytes allocated to Device 2 can be distributed to the flows originating from Device 1.

In some implementations, the flow control algorithm may be mathematically implemented as follows. Given M traffic classes (e.g., M=3 by default), define $V_{L2,max}^{(i)}$ and $V_{L2}^{(i)}(t)$ to be the buffer limit and instant queue length at time t for traffic class i, respectively, i=1, ..., M. Let a fairness period be defined as K frames. Let the minimum bandwidth percentage of traffic class i be defined as $\omega_i$, with $0 \leq \omega_i \leq 100$ and $\omega_1+\omega_2+ \ldots +\omega_M=100$. The maximum buffer size for each priority is taken as $$V_{L2,max}^{(i)} = a \cdot K \cdot C_{Avg}(t) \cdot \frac{\omega_i}{100},$$

i=1, ..., M where $a \geq 1$ is a configurable scaling factor, and $C_{Avg}(t)$ is defined below in Equation (7). Denote the data amount from layer 3 to layer 2 at a given time t in units of bits per second as $U_i(t)$, i=1, ..., M. The L3 queue servicing procedure may be implemented by following Equations (1)-(6), below.

For the highest priority ("priority 1") traffic (e.g., interactive class), define the following flowing amount:

$$U_1(t)=\min[V_{L3}^{(1)}(t),V_{L2,max}^{(1)}-V_{L2}^{(1)}(t-1)] \quad (1)$$

Where, V refers to the queuing size associated with priority 1 traffic for a given layer as a function of time. The updated layer 2 queue length for priority 1 traffic is given by:

$$V_{L2}^{(1)}(t)=V_{L2}^{(1)}(t-1)+U_1(t) \quad (2)$$

For the intermediate priority ("priority 2") traffic (e.g., streaming class), define the following flowing amount:

$$U_2(t)=\min[V_{L3}^{(2)}(t),V_{L2,max}^{(2)}-V_{L2}^{(2)}(t-1)] \quad (3)$$

Where, the updated layer 2 queue length for priority 2 traffic is given by:

$$V_{L2}^{(2)}(t)=V_{L2}^{(2)}(t-1)+U_2(t) \quad (4)$$

For the lowest priority ("priority 3") traffic (e.g., bulk class), define the following flowing amount:

$$U_3(t)=\min[V_{L3}^{(3)}(t),V_{L2,max}^{(3)}-V_{L2}^{(3)}(t-1)] \quad (5)$$

Where, the updated layer 2 queue length for priority 3 traffic is given by:

$$V_{L2}^{(3)}(t)=V_{L2}^{(3)}(t-1)+U_3(t) \quad (6)$$

Although the foregoing example is described in the context of three traffic classes, it should be appreciated that it may be generalized to any number of traffic classes where the flowing amount for priority i traffic is given by $U_i(t)$ and the updated layer 2 queue length for priority i traffic is given by $V_{L2}^{(i)}(t)$. The flow control algorithm determines the amount of queued data to be moved from L3 to L2. A priority-based round robin over all of the flow's in each traffic class may then be performed. The amount of data pulled from L3 to L2 is in a granularity of a layer 3 packet. In other words, when moving data from a Layer 3 queue to a Layer 2 traffic class queue, a packet is not fragmented.

In implementations, a delay-based random early drop (RED) algorithm, with window size adjustment, may be applied in the L3 flow control algorithm to determine the amount of data to be placed into the Layer 3 queues. Traditionally, RED algorithms are based on the queue size, which assumes that the link capacity is fairly constant over a period of time. However, in a satellite network, the uplink capacity may vary widely. Accordingly, the RED algorithm may be based on the queuing delay. In accordance with some implementations, the queuing delay for each priority of traffic may be calculated as follows. At time t, denote the link capacity in bytes as C(t). For traffic class i, denote the aggregate queue size in bytes as $Q_i(t)$, and the number of bytes transmitted as $S_i(t)$.

First, the average link capacity may be calculated in bytes based on Equation (7):

$$C_{Avg}(t)=\alpha \cdot C(t)+(1-\alpha) \cdot C_{Avg}(t-1), 0<\alpha \leq 1 \quad (7)$$

Second, the average aggregate queue size for each priority of traffic may be calculated in bytes based on Equation (8):

$$Q_{i,Avg}(t)=\alpha \cdot Q_i(t)+(1-\alpha) \cdot Q_{i,Avg}(t-1), 0<\alpha \leq 1, i=1, 2, \ldots, M \quad (8)$$

Third, the average number of bytes transmitted per priority of traffic may be calculated based on equation (9):

$$S_{i,Avg}(t)=\alpha \cdot S_i(t)+(1-\alpha) \cdot S_{i,Avg}(t-1), 0<\alpha \leq 1, i=1, 2, \ldots, M \quad (9)$$

In Equations (7-9), $\alpha$ is a configurable smoothing factor.

Given Equations (7)-(9), the queueing delay (in frames), may be calculated for priority 1 based on Equation (10), priority 2 based on Equation (11), and priority 3 based on Equation (12).

$$D_1(t) = \frac{Q_{1,Avg}(t)}{\max[C_{min}, C_{Avg}(t)]} \cdot N_{super-frame} \quad (10)$$

$$D_2(t) = \frac{Q_{2,Avg}(t)}{\max[C_{min}, C_{Avg}(t) - S_{1,Avg}(t)]} \cdot N_{super-frame} \quad (11)$$

$$D_3(t) = \frac{Q_{3,Avg}(t)}{\max\begin{bmatrix} C_{min}, C_{Avg}(t) - \\ S_{1,Avg}(t) - S_{2,Avg}(t) \end{bmatrix}} \cdot N_{super-frame} \quad (12)$$

Where $N_{super-frame}$ refers to n-time-cycles and $C_{min}$ is a configurable value representing the minimum link capacity. This example method of calculation provides more weight for higher priority traffic.

Thereafter, the average queuing delay for each priority may be estimated based on Equation (13):

$$D_{i,Avg}(t)=\beta \cdot D_i(t)+(1-\beta) \cdot D_{i,Avg}(t-1), 0<\beta \leq 1 \quad (13)$$

Where $\beta$ is a configurable smoothing factor.

Subsequently, for each priority class, the estimated average queuing delay is used to determine a respective dropping probability. Minimum and maximum delay values for each priority class may be configured based on network characteristics, as defined by Equation (14).

If $D_{Avg}(t) \le D_{min}$, $P_{RED} = 0$;  (14)

If $D_{min} < D_{Avg}(t) \le D_{max}$, $$P_{RED} = P_{max} \cdot \frac{D_{Avg}(t) - D_{min}}{D_{max} - D_{min}};$$

If $D_{Avg}(t) > D_{max}$, $P_{RED} = P_{max}$.

Where $D_{max}$ and $D_{min}$ are the respective maximum and minimum delay bounds, and $P_{max}$ is a configurable value representing the maximum dropping probability.

RED has innate oscillation characteristics. In some implementations, in order to minimize the oscillations, especially in the case of accelerated flows, RED coupled with Adaptive Window size adjustment (AWA) may be used. This may yield a much improved stability in the data throughput rate. Each traffic class may apply its own RED algorithm for controlling the amount of traffic queued in the Layer 3 queues. A tail dropping method may be used to control the incoming un-accelerated traffic and RED-AWA may be used in controlling accelerated traffic.

Figure 13:
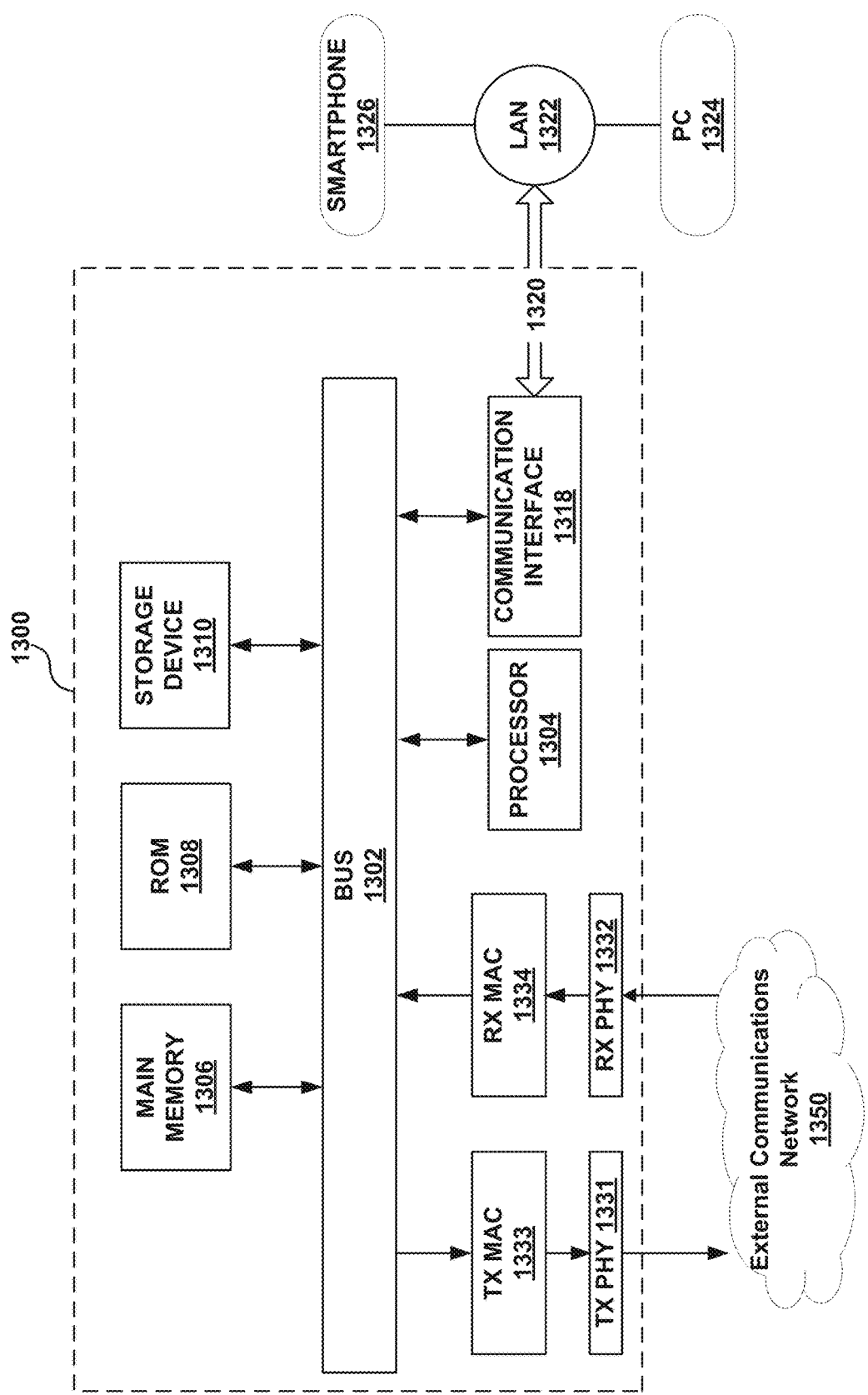
FIG. 13 illustrates a computer system/communication device upon which example embodiments according to the present disclosure can be implemented.

FIG. 13 illustrates a computer system/communication device 1300 upon which example embodiments according to the present disclosure can be implemented. Computer system 1300 can include a bus 1302 or other communication mechanism for communicating information, and a processor 1304 coupled to bus 1302 for processing information. Computer system 1300 may also include main memory 1306, such as a random access memory (RAM) or other dynamic storage device, coupled to bus 1302 for storing information and instructions to be executed by processor 1304. Main memory 1306 can also be used for storing temporary variables or other intermediate information during execution of instructions to be executed by processor 1304. Computer system 1300 may further include a read only memory (ROM) 1308 or other static storage device coupled to bus 1302 for storing static information and instructions for processor 1304. A storage device 1310, such as a magnetic disk or optical disk, may additionally be coupled to bus 1302 for storing information and instructions.

According to one embodiment of the disclosure, traffic flow control may be provided by computer system 1300 in response to processor 1304 executing an arrangement of instructions contained in main memory 1306. Such instructions can be read into main memory 1306 from another computer-readable medium, such as storage device 1310. Execution of the arrangement of instructions contained in main memory 1306 causes processor 1304 to perform one or more processes described herein. One or more processors in a multi-processing arrangement may also be employed to execute the instructions contained in main memory 1306. In alternative embodiments, hard-wired circuitry is used in place of or in combination with software instructions to implement various embodiments. Thus, embodiments described in the present disclosure are not limited to any specific combination of hardware circuitry and software.

Computer system 1300 may also include a communication interface 1318 coupled to bus 1302. Communication interface 1318 can provide a two-way data communication coupling to a network link 1320 connected to a local network 1322. Wired and/or wireless links may be implemented. In any such implementation, communication interface 1318 sends and receives electrical, electromagnetic, or optical signals that carry digital data streams representing various types of information.

Network link 1320 may provide data communication through one or more networks to other data devices. By way of example, network link 1320 can provide a connection through local area network 1322 to network devices, for example including a host computer (PC) 1324, a smartphone 1326, and the like. Local area network 1322 may both use electrical, electromagnetic, or optical signals to convey information and instructions. The signals through the various networks and the signals on network link 1320 and through communication interface 1318, which communicate digital data with computer system 1300, are example forms of carrier waves bearing the information and instructions.

Computer system 1300 may send messages and receive data, including program code, through the network(s), network link 1320, and communication interface 1318. In the Internet example, a server (not shown) might transmit requested code belonging to an application program for implementing an embodiment of the present disclosure through local network 1322 and communication interface 1318. Processor 1304 executes the transmitted code while being received and/or store the code in storage device 1310, or other non-volatile storage for later execution. In this manner, computer system 1300 obtains application code in the form of a carrier wave.

Computer system 1300 includes equipment for communication with an external communications network. In particular, the computer system 1300 may include a transmit-side physical-layer device (TX PHY) 1331, a receive-side physical-layer device (RX PHY) 1332, a transmit-side media access controller (TX MAC) 1333, and a receive-side media access controller (RX MAC) 1334. Transmit packets may be provided to the TX MAC 1333 and TX PHY 1331, which provide corresponding signals to the external communications network 1350. For example, in a satellite communications network, TX MAC may be a TX satellite link controller (SLC), and TX PHY 1331 may provide corresponding signals to a satellite using a terrestrial antenna/dish. Signals received from an external communications network 1350 may be received via RX PHY 1332 and RX MAC 1334, from which receive packets may be obtained.

Figure 14:
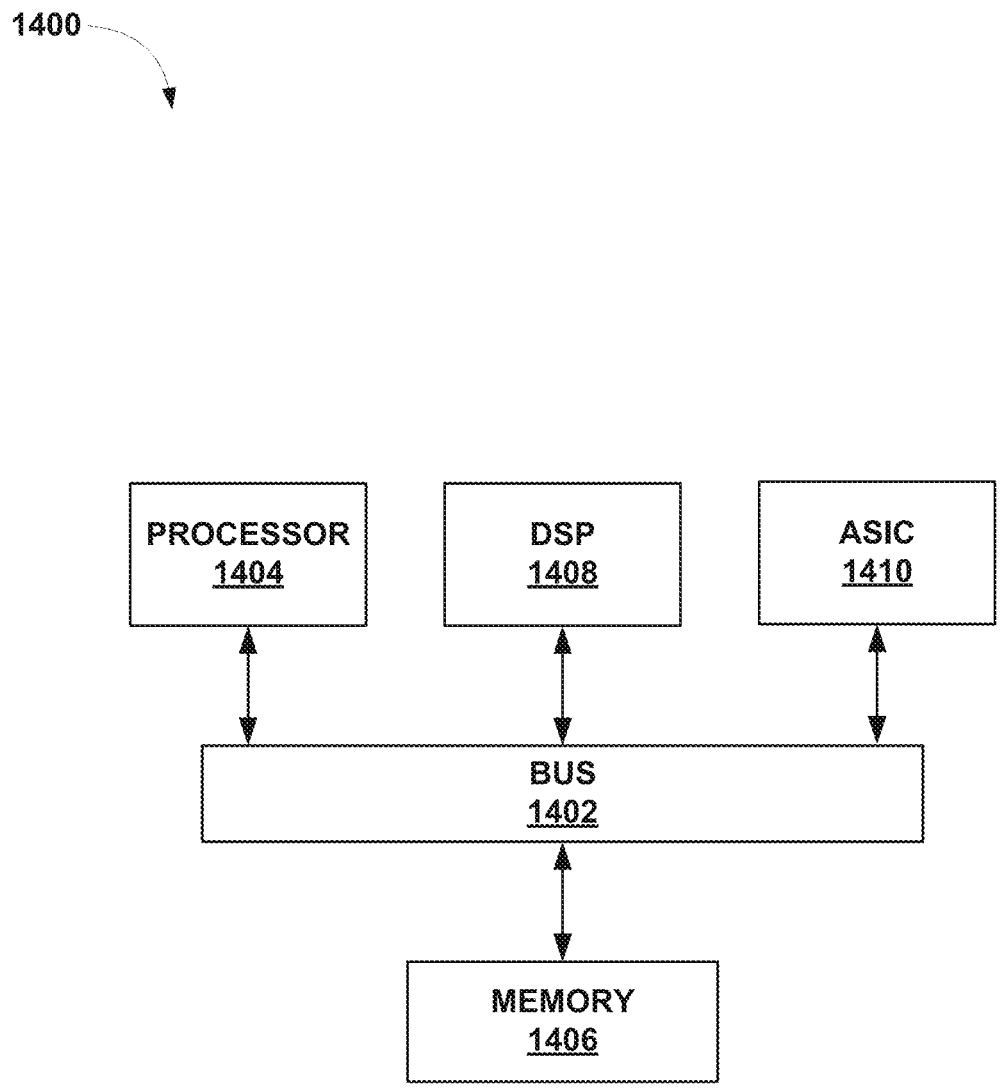
FIG. 14 illustrates a chip set in which embodiments of the disclosure may be implemented.

FIG. 14 illustrates a chip set 1400 in which embodiments of the disclosure may be implemented. Chip set 1400 can include, for instance, processor and memory components described with respect to FIG. 2 or FIG. 13 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 1400 includes a communication mechanism such as a bus 1002 for passing information among the components of the chip set 1400. A processor 1404 has connectivity to bus 1402 to execute instructions and process information stored in a memory 1406. Processor 1404 includes one or more processing cores with each core configured to perform independently. A multi-core processor enables multiprocessing within a single physical package. Examples of a multi-core processor include two, four, eight, or greater numbers of processing cores. Alternatively or in addition, processor 1404 includes one or more microprocessors configured in tandem via bus 1402 to enable independent execution of instructions, pipelining, and multithreading. Processor 1404 may also be accompanied with one or more specialized components to perform certain processing functions and tasks such as one or more digital signal processors (DSP) 1408, and/or one or more application-specific integrated circuits (ASIC) 1410. DSP 1408 can typically be configured to process real-world signals (e.g., sound) in real time independently of processor 1404. Similarly, ASIC 1410 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 1404 and accompanying components have connectivity to the memory 1406 via bus 1402. Memory 1406 includes both dynamic memory (e.g., RAM) and static memory (e.g., ROM) for storing executable instructions that, when executed by processor 1404, DSP 1408, and/or ASIC 1410, perform the process of example embodiments as described herein. Memory 1406 also stores the data associated with or generated by the execution of the process.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
    receiving a plurality of traffic flows transmitted by a plurality of user devices over a local area network (LAN), the LAN comprising the plurality of user devices and a modem;
    determining, at the modem, a user device of the user devices that is associated with each of the traffic flows;
    classifying, at the modem, each of the traffic flows according to a class of service associated with a traffic class, the traffic flows being associated with multiple different traffic classes and multiple classes of service; and
    allocating, at the modem, bandwidth to each of the traffic flows based on the traffic flow's class of service and the user device associated with the traffic flow by:
        distributing available bandwidth between the different traffic classes based on a configured minimum bandwidth for each of the different traffic classes;
        after distributing the available bandwidth between the different traffic classes, distributing a portion of the available bandwidth distributed to each traffic class between one or more of the classes of service that are associated with each traffic class; and
        after distributing the portion of the available bandwidth distributed to each traffic class between the one or more classes of service associated with each traffic class, distributing a portion of the available bandwidth distributed to each class of service between one or more of the user devices that are associated with each class of service.

2. The method of claim 1, wherein:
    each of the user devices is assigned a priority relative to the other user devices; and distributing the portion of the available bandwidth distributed to each class of service between one or more of the user devices that are associated with each class of service, comprises: distributing, based on the priorities assigned to the user devices, the portion of the available bandwidth distributed to each class of service between one or more of the user devices that are associated with each class of service.

3. The method of claim 1, wherein:
distributing the portion of the available bandwidth distributed to each class of service between one or more of the user devices that are associated with each class of service, comprises: distributing, based on a minimum bandwidth requirement of each of the user devices, the portion of the available bandwidth distributed to each class of service between one or more of the user devices that are associated with each class of service; and
allocating bandwidth to each of the traffic flows further comprises: after distributing the portion of the available bandwidth distributed to each class of service between one or more of the user devices that are associated with each class of service, distributing first bandwidth distributed to one of the user devices between multiple traffic flows transmitted by the one user device.

4. The method of claim 1, wherein allocating bandwidth to each of the traffic flows further comprises: after distributing the portion of the available bandwidth distributed to each class of service between one or more of the user devices that are associated with each class of service, equally distributing first bandwidth distributed to one of the user devices between multiple traffic flows transmitted by the one user device.

5. The method of claim 1, wherein:
the configured minimum bandwidth is a configured minimum bandwidth percentage; and
distributing the available bandwidth between the different traffic classes based on the configured minimum bandwidth for each of the different traffic classes, comprises: distributing a percentage of the available bandwidth to each of the different classes based on the configured minimum bandwidth percentage for each of the different traffic classes.

6. The method of claim 1, wherein distributing the portion of the available bandwidth distributed to each traffic class between one or more of the classes of service that are associated with each traffic class, comprises: distributing, based on weights assigned to the classes of service, the portion of the available bandwidth distributed to each traffic class between one or more of the classes of service that are associated with each traffic class.

7. The method of claim 1, wherein distributing the portion of the available bandwidth distributed to each class of service between one or more of the user devices that are associated with each class of service, comprises: distributing, based on weights assigned to the user devices, the portion of the available bandwidth distributed to each class of service between one or more of the user devices that are associated with each class of service.

8. The method of claim 1, wherein allocating the bandwidth to each of the traffic flows, further comprises: distributing any bandwidth leftover, after distributing the available bandwidth, in a round robin scheme in strict priority order.

9. The method of claim 1, wherein classifying each of the traffic flows according to the class of service associated with the traffic class, comprises:

determining a recent dominant host application type (RDHAT) of one of the devices that transmitted one of the traffic flows; and
classifying, based on at least the RDHAT, the one traffic flow.

10. The method of claim 1, wherein the different traffic classes include traffic classes selected from the group comprising: an interactive traffic class, a streaming traffic class, and a bulk traffic class.

11. A modem, comprising:
a processor; and
a non-transitory computer-readable storage medium storing instructions that, when executed by the processor, cause the modem to perform operations comprising:
receiving a plurality of traffic flows transmitted by a plurality of user devices over a local area network (LAN), the LAN including the plurality of user devices and the modem;
determining a user device of the user devices that is associated with each of the traffic flows;
classifying each of the traffic flows according to a class of service associated with a traffic class, the traffic flows being associated with multiple different traffic classes and multiple classes of service; and
allocating bandwidth to each of the traffic flows based on the traffic flow's class of service and the user device associated with the traffic flow by:
distributing available bandwidth between the different traffic classes based on a configured minimum bandwidth for each of the different traffic classes;
after distributing the available bandwidth between the different traffic classes, distributing a portion of the available bandwidth distributed to each traffic class between one or more of the classes of service that are associated with each traffic class; and
after distributing the portion of the available bandwidth distributed to each traffic class between the one or more classes of service associated with each traffic class, distributing a portion of the available bandwidth distributed to each class of service between one or more of the user devices that are associated with each class of service.

12. The modem of claim 11, wherein:
each of the user devices is assigned a priority relative to the other user devices; and
distributing the portion of the available bandwidth distributed to each class of service between one or more of the user devices that are associated with each class of service, comprises: distributing, based on the priorities assigned to the user devices, the portion of the available bandwidth distributed to each class of service between one or more of the user devices that are associated with each class of service.

13. The modem of claim 11, wherein:
distributing the portion of the available bandwidth distributed to each class of service between one or more of the user devices that are associated with each class of service, comprises: distributing, based on a minimum bandwidth requirement of each of the user devices, the portion of the available bandwidth distributed to each class of service between one or more of the user devices that are associated with each class of service; and
allocating bandwidth to each of the traffic flows further comprises: after distributing the portion of the available bandwidth distributed to each class of service between one or more of the user devices that are associated with each class of service, distributing first bandwidth distributed to one of the user devices between multiple traffic flows transmitted by the one user device.

14. The modem of claim 11, wherein allocating bandwidth to each of the traffic flows further comprises: after distributing the portion of the available bandwidth distributed to each class of service between one or more of the user devices that are associated with each class of service, equally distributing first bandwidth distributed to one of the user devices between multiple traffic flows transmitted by the one user device.

15. The modem of claim 11, wherein distributing the portion of the available bandwidth distributed to each traffic class between one or more of the classes of service that are associated with each traffic class, comprises: distributing, based on weights assigned to the classes of service, the portion of the available bandwidth distributed to each traffic class between one or more of the classes of service that are associated with each traffic class.

16. The modem of claim 11, wherein distributing the portion of the available bandwidth distributed to each class of service between one or more of the user devices that are associated with each class of service, comprises: distributing, based on weights assigned to the user devices, the portion of the available bandwidth distributed to each class of service between one or more of the user devices that are associated with each class of service.

17. The modem of claim 11, wherein allocating the bandwidth to each of the traffic flows, further comprises: distributing any bandwidth leftover, after distributing the available bandwidth, in a round robin scheme in strict priority order.

18. The modem of claim 11, wherein the different traffic classes include traffic classes selected from the group comprising: an interactive traffic class, a streaming traffic class, and a bulk traffic class.

19. A method of allocating bandwidth to each of a plurality traffic flows transmitted by a plurality of user devices over a local area network (LAN) including the plurality of user devices and a modem, the traffic flows being associated with multiple different traffic classes and multiple classes of service, the method comprising:

distributing, at the modem, based on a configured minimum bandwidth for each of the different traffic classes, available bandwidth between the different traffic classes;

after distributing the available bandwidth between the different traffic classes, distributing, at the modem, a portion of the available bandwidth distributed to each traffic class between one or more of the classes of service that are associated with each traffic class; and after distributing the portion of the available bandwidth distributed to each traffic class between the one or more classes of service associated with each traffic class, distributing a portion of the available bandwidth distributed to each class of service between one or more of the user devices that are associated with each class of service.

20. The method of claim 19, wherein the different traffic classes include traffic classes selected from the group comprising: an interactive traffic class, a streaming traffic class, and a bulk traffic class.

* * * * *